(12) United States Patent
Xu et al.

(10) Patent No.: US 8,454,817 B2
(45) Date of Patent: Jun. 4, 2013

(54) MECHANISM FOR DIRECT-WATER-SPLITTING VIA PIEZOELECTROCHEMICAL EFFECT

(75) Inventors: Huifang Xu, Madison, WI (US);
Kuang-Sheng Hong, Madison, WI (US);
Xiaochun Li, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 787 days.

(21) Appl. No.: 12/502,540

(22) Filed: Jul. 14, 2009

(65) Prior Publication Data

US 2010/0012479 A1    Jan. 21, 2010

Related U.S. Application Data

(60) Provisional application No. 61/080,388, filed on Jul. 14, 2008.

(51) Int. Cl.
*C25B 1/04*    (2006.01)
(52) U.S. Cl.
USPC .......................................... 205/637; 205/628
(58) Field of Classification Search
USPC ................................. 205/637, 628
See application file for complete search history.

(56) References Cited

U.S. PATENT DOCUMENTS

| | | | | |
|---|---|---|---|---|
| 5,180,363 | A | * | 1/1993 | Idemoto et al. ................. 604/22 |
| 8,236,149 | B2 | * | 8/2012 | Wilson .......................... 204/272 |
| 2005/0231069 | A1 | * | 10/2005 | Yamazaki et al. ............. 310/317 |
| 2005/0274176 | A1 | * | 12/2005 | Thiesen et al. ................. 73/146 |
| 2007/0205111 | A1 | * | 9/2007 | Bayliss .......................... 205/637 |
| 2009/0121585 | A1 | * | 5/2009 | Lee et al. ...................... 310/319 |

* cited by examiner

*Primary Examiner* — Nicholas A Smith
(74) *Attorney, Agent, or Firm* — Boyle Fredrickson S.C.

(57) ABSTRACT

A mechanism of initiating a redox reaction, such as hydrogen gas production by direct-water-splitting, is provided in which a piezoelectric material is mechanically stressed by actively applying a mechanical stress to the material. The mechanical stress applied to the piezoelectric material causes an electrical potential build up on the surface of the material due to the piezoelectric properties of the material. When the piezoelectric material stressed in this manner is placed in direct contact with the redox reaction reactant(s), the potential on the polarized surface can be used as chemical driving energy to initiate the reaction, such as to split water and generate hydrogen gas. In this manner the mechanical energy applied to the piezoelectric material, such as vibration energy from natural or man-made sources, can be converted directly into chemical energy to initiate the reaction.

16 Claims, 17 Drawing Sheets

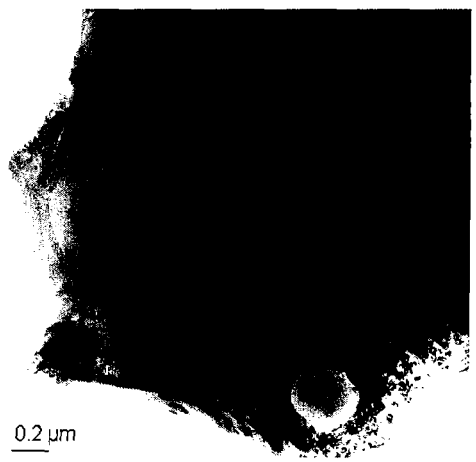
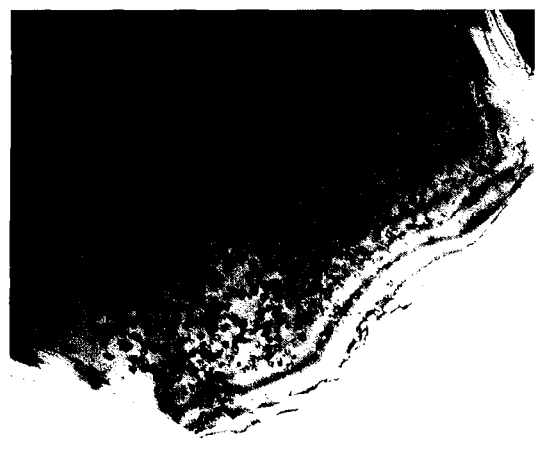
FIG. 16A　　　　　　　　　　FIG. 16B
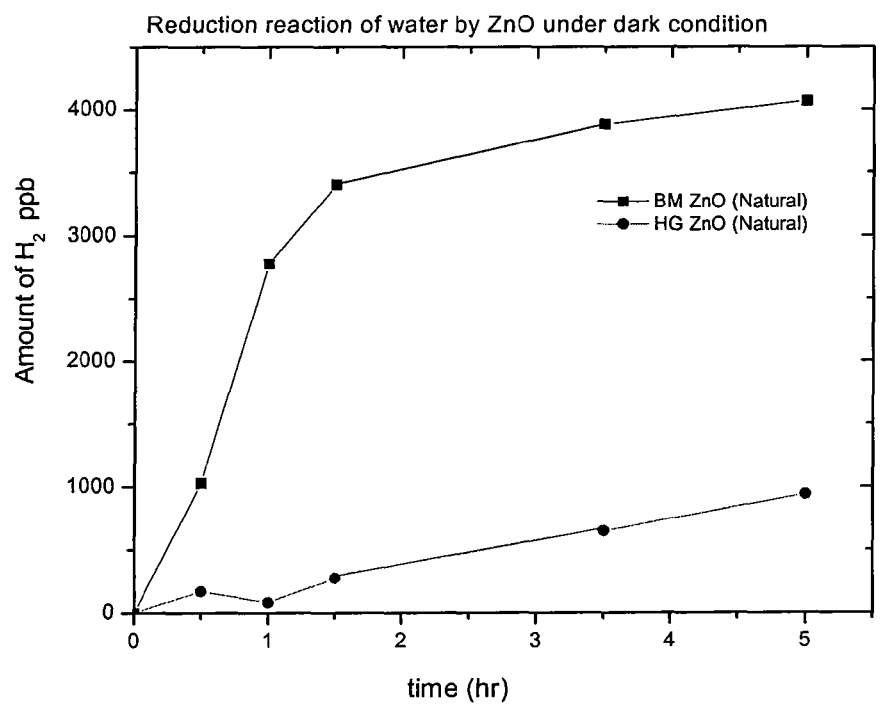
FIG. 17

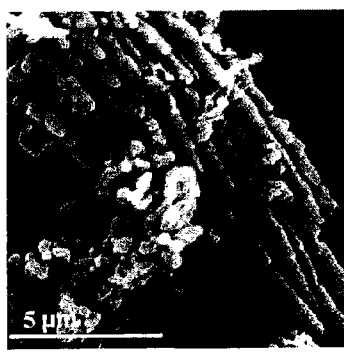
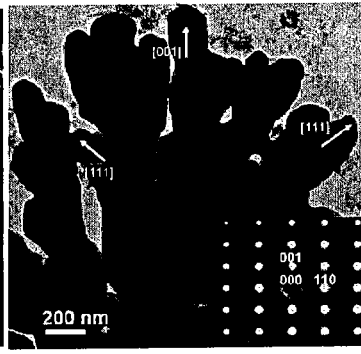
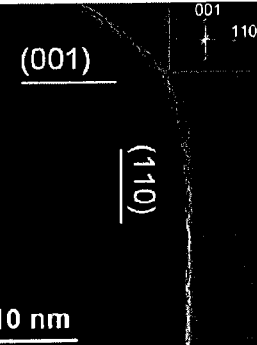
FIG. 24  FIG. 25  FIG. 26
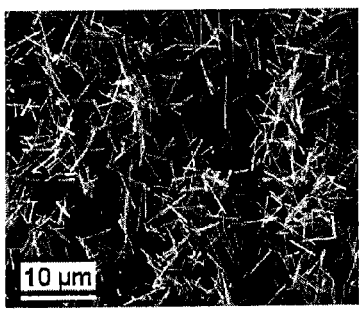
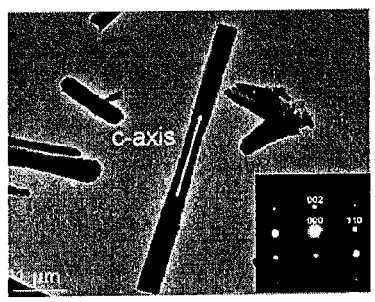
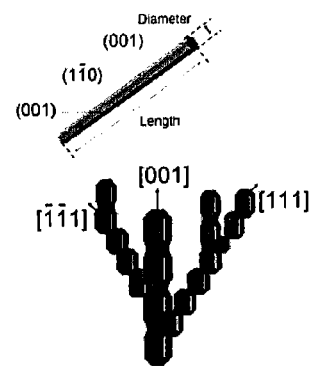
FIG. 27  FIG. 28  FIG. 29
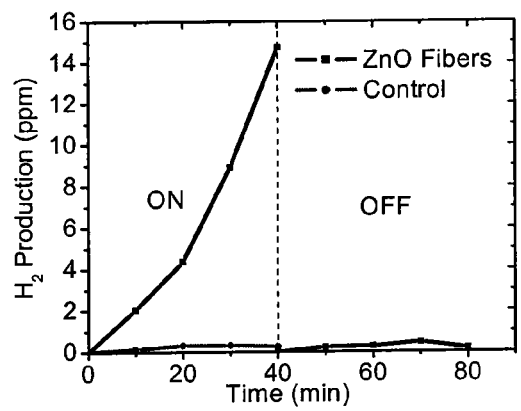
FIG. 30

MECHANISM FOR DIRECT-WATER-SPLITTING VIA PIEZOELECTROCHEMICAL EFFECT

CROSS-REFERENCE TO RELATED APPLICATIONS

This application claims priority from U.S. Provisional Patent Application Ser. No. 61/080,388, filed on Jul. 14, 2008, the entirety of which is hereby expressly incorporated by reference herein.

STATEMENT REGARDING FEDERALLY SPONSORED RESEARCH OR DEVELOPMENT n/a

FIELD OF THE INVENTION

The present invention relates to oxidation/reduction reactions, and more specifically to directly initiating these types of reactions utilizing a mechanical mechanism.

BACKGROUND OF THE INVENTION

As the world today rapidly increases its demand of the fuels, energy shortage becomes one of the most challenging issues the human being is facing. Fossil fuels, which currently contribute more than 85% of the world's energy supply, are expected to be depleted in the following 30~50 years. In addition, it is extensively believed that burning the fossil fuels is the major cause for global-warming and long term climate change leading to natural disasters, further pressing on the need for reductions in fossil fuel usage.

These possible near-future environmental disasters have attracted people's attention and resulted in a vast and growing interest in development of alternative renewable energy resources. Among the studies that have been done, hydrogen energy is considered as an alternative to fossils fuels as a source of energy, and is expected to have enormous growth potential as a result of recent advances in technology. Hydrogen is renewable, very flexible in conversion to other forms of energy, and no air pollutants or green house gases are produced from the combustion of hydrogen. In an idealistic, long-term vision, a hydrogen/electricity interchangeable energy source can provide power for all aspects of the energy economy such as transportation, industrial, and residential usage.

Traditionally, hydrogen gases are produced primarily via the processes of steam reforming methane and electrolysis of water. The former produces $CO_2$ (a green house gas) that is released into the atmosphere, while the later uses electricity generated from fossil fuels.

In recent years, the alternative production method of using solar energy to produce hydrogen has triggered great interest. Specifically, photocatalytic water splitting using oxide semiconductors under irradiation has received great attention. A tremendous amount of research articles have recently been published on the topic, such as concerning the use of a titania-based photocatalyst, which is the most common material for hydrogen production, in photovoltaic cells, as well as in environmental decontamination. Thousands of studies are ongoing concerning improving the performance of this and other photocatalysts in two main areas: 1) quantum efficiency, such as oxide-doping and metals additions; and 2) solar efficiency, including anion doping, and physically/chemically implanting the transition metals in the photocatalyst. Yet, all the research currently being done contains many limitations and drawbacks including the small number of available photocatalysts, their limited efficiency, cost, and device life-time, which still remain unsolved up to this point.

As a result, it is highly desirable to develop a mature and commercially available technology for hydrogen production that can be put directly into application in daily usage.

SUMMARY OF THE INVENTION

According to one aspect of the present invention, a novel method of hydrogen production is provided that employs direct water-splitting. Instead of utilizing existing semiconductor materials (i.e., $TiO_2$-based materials), and the limitation of sun harvesting to generate hydrogen from these materials, the present invention involves the direct conversion of mechanical energy into chemical energy for splitting water and forming hydrogen and oxygen gases. The mechanism for this conversion is a novel phenomenon, i.e., the direct conversion of mechanical energy to chemical energy, which is termed the Piezoelectrochemical (PZEC) Effect. The mechanism of the water decomposition via PZEC effect relies upon the piezoelectric properties of the materials utilized in the process. Although the piezoelectric effect has been known for over one hundred years and has been demonstrated in many fields, little work has been done to address its application in wet conditions, such as in solution, and particularly in the direct conversion of mechanical energy to chemical energy.

More specifically, certain piezoelectric materials, including but not limited to α-quartz ($SiO_2$), ZnO, or $BaTiO_3$, among others, have unique piezoelectric properties where the piezoelectricity is an intrinsic property of the material, such that no physical/chemical doping (cations or anions), chemical additives (including transition metals) or any forms of implantation are needed to create these properties. In addition, one of the materials having these properties, i.e., quartz, is also one of the most abundant minerals on the Earth's surface (i.e. beach sands). As a result, by using quartz as a material in the process, the hydrogen production via direct-water-splitting can be achieved at a low cost, and, because quartz is a natural material that is environmental friendly, no pollution issues are created by the process.

When a mechanical force is applied to materials having these properties, the materials generate an electrical response in the form of positive and negative charges being generated at the surface of the material. This electrical charge can then interact with the surrounding the chemical species in the environment surrounding the material, which can take various forms in the present invention, such as an aqueous environment. This interaction takes the form of catalyzing an oxidation/reduction reaction, such as a water-splitting reaction with the water molecules in the aqueous environment in which the mechanically-stressed piezoelectric material is placed.

According to another aspect of the present invention, the mechanical stress applied to the piezoelectric material to generate the electrical response can be supplied from any of a number of potential sources of mechanical force, such as the forces exerted on a roadway or walkway over which cars and pedestrians are passing, or the force generated by sound waves striking a surface, among others.

According to still another aspect of the present invention, the piezoelectric material can take various forms depending upon the particular environment and/or mechanical force supply with which the material is to be utilized. The piezoelectric material can be formed as fibers of various configurations, lengths and/or thicknesses that are optimized for the mechanical force supply for the piezoelectric material. Also, a support for the piezoelectric materials can be formed to maximize the exposure of the materials to the chemical species in the environment surrounding the material.

Numerous other aspects, features and advantages of the present invention will be made apparent from the following detailed description taken together with the drawing figures.

BRIEF DESCRIPTION OF THE DRAWINGS

The drawing figures illustrate the best mode currently contemplated of practicing the present invention.

In the drawings:

FIGS. 16A-16B are photomicrographs of quartz grains;

FIG. 17 is a graph of hydrogen production by zinc oxide in water under non-irradiated conditions;

FIG. 24 is an SEM image of $BaTiO_3$ dendrites grown on glass substrate;

FIG. 25 is an TEM image of $BaTiO_3$ dendrites grown on glass substrate;

FIG. 26 is an HRTEM image of one $BaTiO_3$ crystal in the dendrite showing (001) and (110) lattice fringes;

FIG. 27 is an SEM image showing the typical morphology and crystal direction of ZnO fibers grown on Si (100) wafer, in which the ZnO fibers were elongated along c-axis with diameter around 0.4 μm;

FIG. 28 is an TEM image showing the typical morphology and crystal direction of ZnO fibers grown on Si (100) wafer, in which the ZnO fibers were elongated along c-axis with diameter around 0.4 μm;

FIG. 29 is a schematic diagram showing shapes of a single ZnO fiber (upper) and $BaTiO_3$ dendrite (lower).

FIG. 30 is a graph illustrating the evolution of $H_2$ as a function of time showing performance of as-synthesized ZnO fibers on Si (100) wafer (1×1 cm²) in water responding to ultrasonic waves;

DETAILED DESCRIPTION OF THE INVENTION

Figure 1:
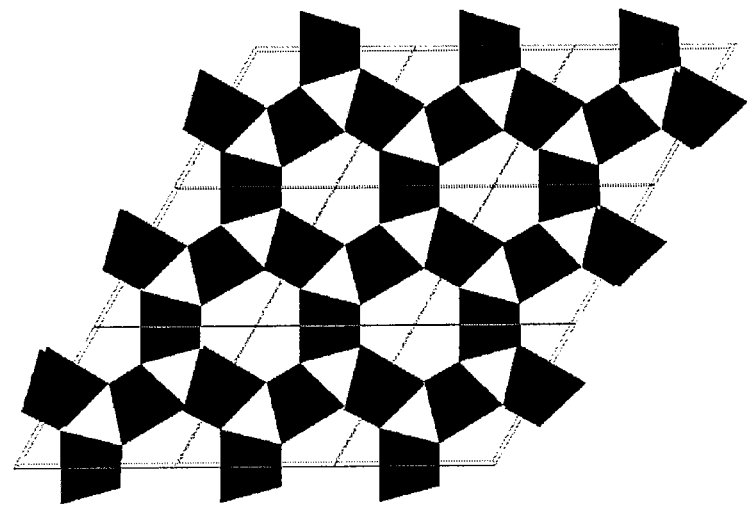
FIG. 1 is a schematic view of α-quartz along the c-axis.

With reference now to the drawing figures in which like reference numerals designate like parts throughout the disclosure, the present invention is a method and apparatus for converting mechanical energy applied to piezoelectric materials into chemical energy for the formation of hydrogen for use as an alternative energy source. This is accomplished by positioning a number of fibers of a piezoelectric material within an aqueous environment and applying the mechanical force to the piezoelectric fibers to initiate a water-splitting reaction at the surface of each piezoelectric fiber, thereby producing hydrogen.

Electrochemistry of Direct-Water-Splitting

In an electrochemical cell, electrons flowing from the anode to the cathode are driven by electromotive force (emf), which is produced by the difference in electrical potential energy between the two electrodes. The quantity of the electrical work produced is defined as a function of potential energy difference and the number of electrons:

Electrical work=Number of Electrons*Potential Energy Difference

Note that the charge on a single electron is $1.6022 \times 10^{-19}$ C, where the coulomb (C) is defined as a 1 ampere flow for 1 second. The emf of an electrochemical cell (or commonly named cell voltage), indicates the amount of work a cell can produce for each coulomb of charge that the chemical reaction produces. The standard cell voltage ($E°$) is measured under standard conditions, in which all reactants and products must be present as a pure form at 1 bar pressure or 1 M concentration. The cell voltage of any reaction is obtained by using the standard voltages of the half-reactions that occur at the cathode and anode:

$$E°_{cell} = E°_{cathode} - E°_{anode}$$

By definition, the standard hydrogen electrode, in which hydrogen gas at 1 bar pressure is bubbled over a platinum electrode immersed in aqueous acid solution, with an activity of hydrogen ions of 1 at 25° C. is assigned the value of 0 V:

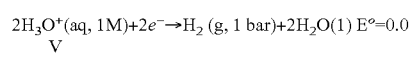

Thus, all other standard electrode potentials are measured in values relative to the standard hydrogen electrode. Some additional redox potentials are listed in Table 1 for comparison.

TABLE 1

Standard reduction potentials in aqueous solution at 25° C.

| Reduction Half-Reaction | | E° (V) |
|---|---|---|
| $F_2(g) + 2e^-$ | $\rightarrow 2F^-(aq)$ | +2.87 |
| $Au^{3+}(aq) + 3e^-$ | $\rightarrow Au(s)$ | +1.50 |
| $Fe^{3+}(aq) + e^-$ | $\rightarrow Fe^{2+}(aq)$ | +0.771 |
| $O_2(g) + 4H_3O^+(aq) + 3e^-$ | $\rightarrow 6H_2O(l)$ | +1.229 |
| $2H_3O^+(aq) + 2e^-$ | $\rightarrow H_2(g) + 2H_2O(l)$ | 0.00 |
| $PbSO_4(s) + 2e^-$ | $\rightarrow Pb(s) + SO_4^{2-}(aq)$ | -0.356 |
| $Fe^{2+}(aq) + 2e^-$ | $\rightarrow Fe(s)$ | -0.44 |
| $Zn^{2+}(aq) + 2e-$ | $\rightarrow Zn(s)$ | -0.763 |
| $Li^+(aq) + e^-$ | $\rightarrow Li(s)$ | -3.045 |

From Table 1 it is found that the reduction half-reaction of water at the cathode is defined as 0.0V, while the oxidation half-reaction of water to oxygen requires 1.229V of potential. Thus, the overall reaction requires 1.229V (1.229-0=1.229V) of chemical potential energy. As a result, the Gibbs free energy of splitting water into hydrogen and oxygen under a standard condition can be expressed as:

$$\Delta G^0 = -nFE^0_{cell}$$

$$= 237.141 \text{ kJ/mol}$$

where n=number of moles, and F=Faraday constant=9.6485× $10^4$ C/mol. Therefore, the threshold energy can be described:

$$E_t = \frac{\Delta G^0(H_2O)}{2N_A}$$

$$= 1.23 \text{ eV}$$

where $N_A$=Avogadro's number=6.02×10

Introduction of Quartz

Quartz or α-quartz is a well known mineral form of $SiO_2$ that is stable below 573° C. at low pressure. Quartz is usually found in sedimentary, igneous, metamorphic, and hydrothermal mineral environments, particularly in continental regions. However, quartz rarely forms in oceanic rocks. Quartz has both piezoelectric and pyroelectric properties, and it contains very limited amount of impurity in substitution. The polymorphs of quartz include β-quartz, tridymite, cristobalite, coesite, stishovite, moganite, and keatite.

Quartz is usually colorless and the luster is vitreous. Many other colored varieties, however, have been described including citrine (yellow), smoky quartz (gray), amethyst (purple), and rose quartz (pink). There is no cleavage on quartz, which thus reveals its conchoidal fracture. The hardness of quartz is seven (7) with the density of 2.67 g/cm³. Optically, quartz is uniaxially positive with a maximal birefringence of 0.0095. Table 2 below shows some physical constants of quartz.

TABLE 2

General physical properties of quartz

| Chemical Formula | $SiO_2$ |
|---|---|
| Optical Properties | Uniaxial positive |
| | Nω = 1.5443 |
| | Nε = 1.5538 |
| Cleavage | None |

TABLE 2-continued

General physical properties of quartz

| Common crystal forms | Prism {1010} |
|---|---|
| | Pyramids {1011} and {0111} |
| Luster | Vitreous |
| Color, Opacity | Transparent, colorless |
| | Also gray (smoky quartz), blue, purple |
| | (amethyst), yellow (citrine), pink (rose quartz) |
| Hardness | 7 |

The structure of quartz consists of $SiO_4$ tetrahedrals with corner-sharing. In other words, each Si is bonded to four oxygen, and each oxygen is connected with two Si. This structure forms an open three-dimensional (3D) framework (framework silicate). Quartz usually refers to the stable form α-quartz at atmospheric temperature and pressure. α-quartz is less dense then the high pressure forms coesits and stishovite; whereas it is denser than tridymite and cristobalite, which are the high temperature polymorphs of quartz. Low temperature α-quartz with trigonal symmetry will reversibly transfer to hexagonal β-quartz above 537° C. Crystallographic data and structure for quartz are illustrated in Table 3, Table 4, and FIG. 1. Note that the space groups are $P3_121$ for right handed and $P3_221$ for left handed.

TABLE 3

Crystallographic data of quartz [23]

| Crystal System | Trigonal |
|---|---|
| Point Group | 32 |
| Space Group | $P3_121$ or $P3_221$ |
| Unit Cell Parameters | |
| a | 4.1937 Å |
| c | 5.4047 Å |
| Z (No. of Formula Units per Cell) | 3 |
| Density (calculated) | 2.648 g/cm³ |
| Density (measured) | 2.65 g/cm³ |

TABLE 4

Atom Coordinate of quartz [24]

| Atom | x/a | y/b | z/c |
|---|---|---|---|
| Si | 0.4697 | 0 | 0 |
| O | 0.4133 | 0.2672 | 0.1188 |

Piezoelectric Effect of Quartz

The piezoelectricity of quartz was found by Pierre and Jacques Curie in 1880, when they observed that a pressure exerted on a small piece of quartz caused an electrical potential between deformed surfaces, and that application of a voltage effected physical displacements. The piezoelectric property of quartz is caused as the result a pressure applied to the quartz, which deforms the crystal lattice and causes a separation of the centers gravity of the positive and negative charges. As a result, a non-zero dipole moment is found in each molecule. Assuming a quartz electrode has been short-circuited and stress is applied, free negative charges will be drawn toward the electrode in the direction of positive charge separation, and the free positive charges will move in the opposite direction. When the stress is released, the charges will flow back to their normal position. If a resistance is attached into the circuit with an application of sinusoidal stress to the quartz, an alternating current will flow through the load, and consequently mechanical power will be converted to the electrical power. In reverse, an alternating voltage in the circuit will produce alternating stress energy (mechanical energy) in the quartz.

Figure 2A:
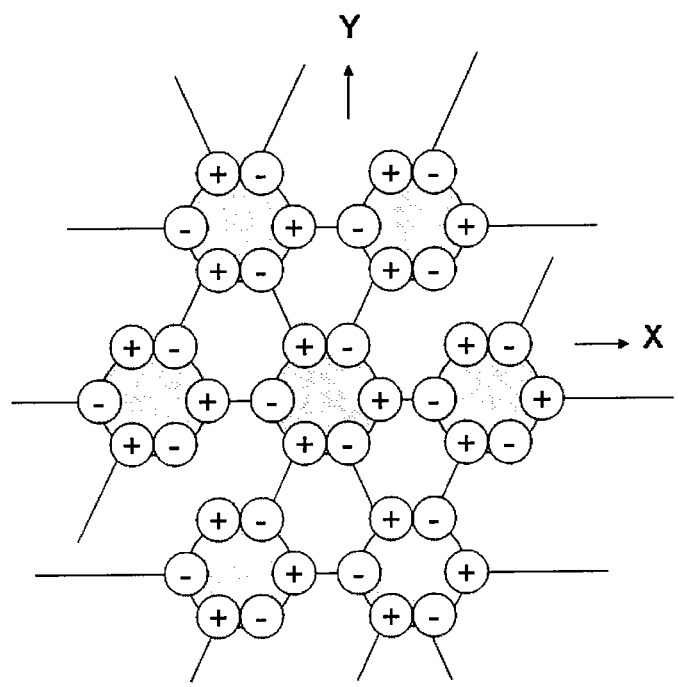
FIGS. 2A-2C are schematic views of quartz molecules in the unstrained, longitudinally strained and shear strained states.
Figure 2B:
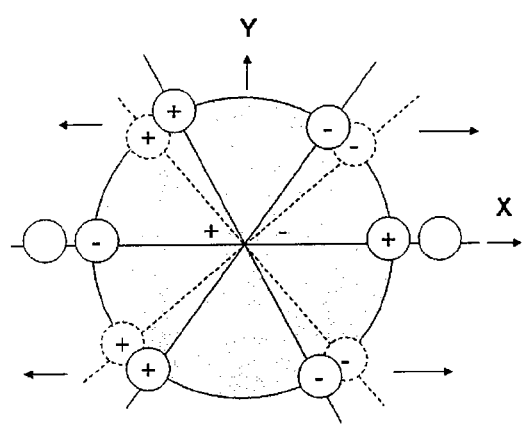
Figure 2C:
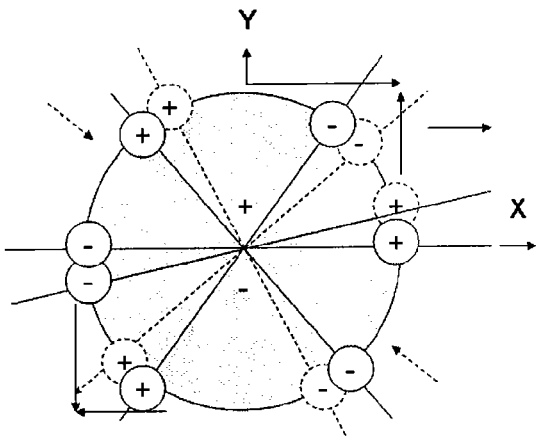

FIGS. 2A-2C illustrate Kelvin's model of molecules. Based on the diagram, there are two type of stress that will produce a charge separation normal to the axis: longitudinal and shear stress. If a quartz crystal is stresses along the x- or electrical axis as shown in FIG. 2B, the apex molecules are then been separated farther apart without changing the separation between the other molecules. This results in a separation of the center of gravity of the positive and negative charges, in which the positive charge moves to left while the negative charge moves to the right. The separation is still along the electric axis, but is in the opposite direction to that caused by a stress along the y-axis. Consequently, a longitudinal stress can produce charge along the electrical axis.

However, if we apply a sheer stress to the quartz as in FIG. 2C, the separation of the center of charges can occur along the mechanical axis of the crystal, such that the simple shear stress is acting normal to the direction of space separation. From the diagram, the shear stress induces the charges to be displaced form their original position. This causes the current of positive charges and negative charges to move downward and upward along the y-axis, respectively. The piezoelectric effect of quartz including the shearing stresses on the molecules in YZ and XZ plane can be quantitatively expressed as:

$$P_X = -d_{11}X_X + d_{11}Y_Y - d_{14}Y_Z P_Y = -d_{11}X_Y + 2d_{14}X_Y$$

where $P_x$ is the charge per unit area on the electrode surface to the x-axis due to the applied longitudinal stresses $X_x$ and $Y_y$; $P_y$ is the charge per unit area normal to the y-axis caused by the shearing stress $X_y$; $d_{11}$ and $d_{14}$ are the piezoelectric constant, in which $d_{11} = -6.76 \times 10^{-8}$ (e.s.u/dyne), $d_{14} = 2.56 \times 10^{-8}$ (e.s.u/dyne).

In conclusion, the piezoelectricity of materials depends on the symmetry of the crystals, i.e., if there is center of inversion in the crystal, piezoelectric effect will not occur. Quartz is one of about 20 crystal groups out of a total of 32 possible point groups that have a piezoelectric effect.

Piezoelectricity

As stated above, piezoelectricity is a linear effect where a material having the piezoelectric property becomes electrically polarized when they are strained, or where the material becomes strained when placed in an electric field. This phenomenon is also named direct piezoelectric effect. The origin of the piezoelectricity is due to the displacement of the ionic charge in a crystal structure. Under a stress condition, the charge distribution is no longer symmetrical, which leads to the formation of a net electric dipole moment not equal to zero and results in an internal electric field. Note that only a material without symmetry center can be piezoelectric.

Figure 3:
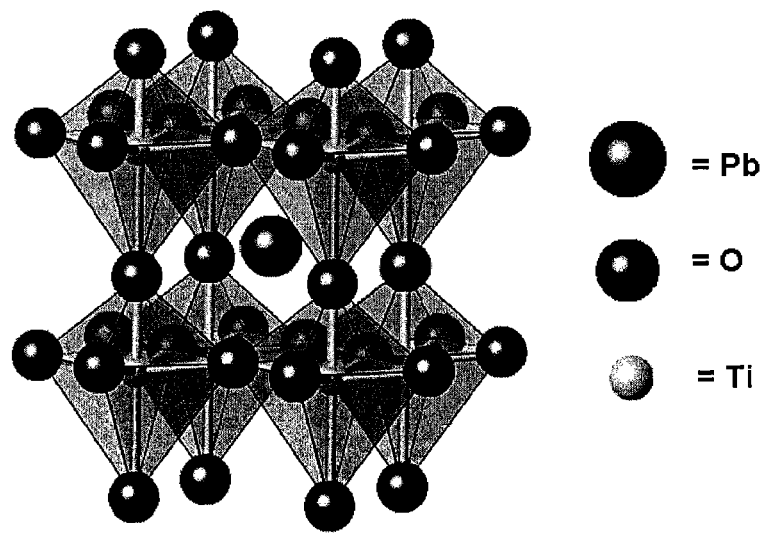
FIG. 3 is a schematic view of the Perovskite structure of PZT.

The piezoelectric effect was first discovered in quartz, tourmaline, and Rochelle slat for the generation of electrical charge under pressure conditions. In 1935, Busch and Scherrer discovered piezoelectricity in potassium dihydrogen phosphate (KDP), which was the first major family of piezoelectric and ferroelectrics to be found. The major breakthrough of the piezoelectric materials was the discovery of barium titanate and lead zircronate titanate (PZT) family in 1940 and 1950, respectively. Currently, PZT is one of the most widely used piezoelectric materials in the world. Note that both barium titanate and PZT are based on the perovskite structure (FIG. 3), which has a general formula of $ABO_3$.

In perovskite, the corner-sharing oxygen octahedra are linked in a cubic array with smaller cations such as Ti, Zr, Sn, Nb etc. (B-site), and larger cations such as Pb, Ba, Sr, Ca, Na, etc., filling the interstices between octahedra (A-site). Note that perovskite structure allows for multiple substitutions on the A and B-site to form complex compounds including (Ba, Sr)$TiO_3$, (Pb,Sr)(Zr,Ti)$O_3$, and (KBi)$TiO_3$.

Figure 4:
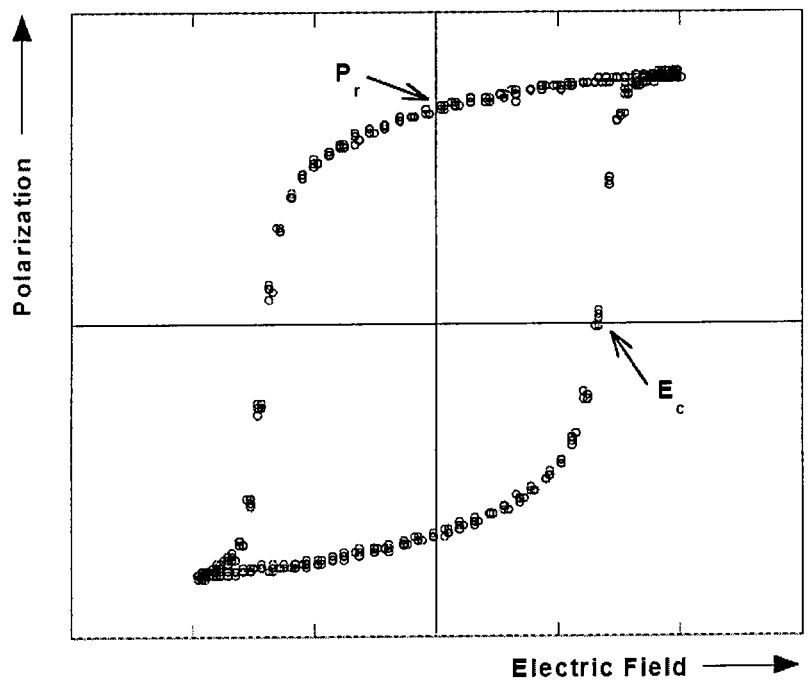
FIG. 4 is a graph of a hysteresis loop for a poled piezoelectric ceramic material.

Some piezoelectric materials are also ferroelectric, particularly under their Curie temperature (Tc), which possess a spontaneous polarization that can be reversed in direction by application of an electric field over some temperature range. A ferroelectric hysteresis loop can be formed by applying an alternating electric field to cause the polarization to reverse, in which it relates the polarization P to the applied electric field E. A typical field-polarization loop is shown in FIG. 4.

The electric displacement D and the polarization P are related to each other through a linear equation:

$$D_i = P_i + \epsilon_0 E_i$$

Figure 5:
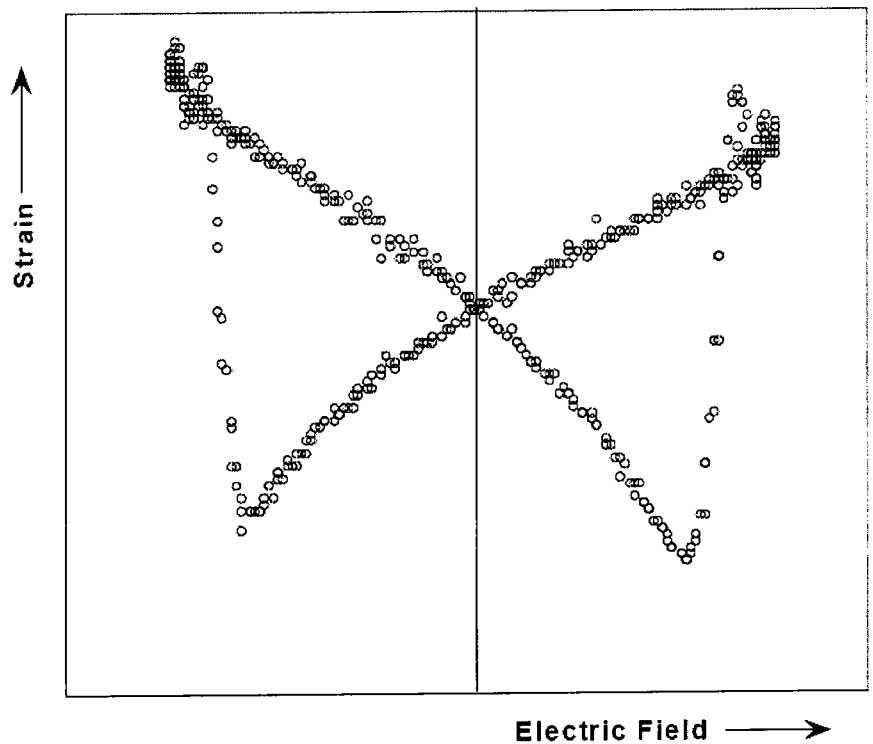
FIG. 5 is a graph of a butterfly loop of a piezoelectric ceramic material.

Both D and P are non-linear function of the field E. In the equation above, $\epsilon_0$ is the permittivity of free space (8.85 × $10^{-12}$ C/V*m). Two important characteristics of the P-E loop (FIG. 4) are coercive field $E_c$ and the remnant polarization $P_r$, in which $E_c$ is the field at which the polarization is zero, while $P_r$ is the value of the polarization when the electric field is zero. When both $P_r$ and $E_c$ no longer vary, the loop is known as saturated. In addition, the ferroelectric hysteresis loops are frequency and temperature dependent. By the same analogy, polarization switching leads to strain-electric field hysteresis for piezoelectric materials (FIG. 5). Because of the shape, the strain-electric hysteresis loop often referred to as the "butterfly loop", in which the converse piezoelectric effect dictates that a strain results as the electric field is applied. When the field is increased, the strain is no longer linear with the field as domain walls start switching.

Figure 6:
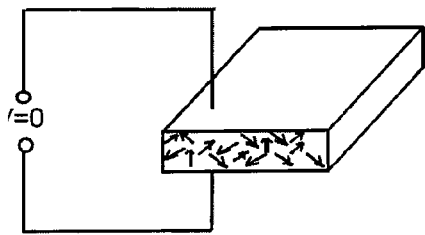
FIG. 6 is a schematic view of a piezoelectric and ferroelectric ceramic material in an unpoled state.
Figure 7:
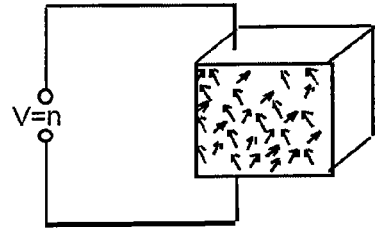
FIG. 7 is a schematic view of a piezoelectric and ferroelectric ceramic material in a poled state.

The possibility of piezoelectricity in a material can be further determined by the specific symmetry of the crystal unit cell. Note that all crystals can be divided into 32 point group from 7 basic crystal systems (cubic, hexagonal, rhombohedral, tetragonal, orthorhombic, monoclinic, and triclinic). Of the 32 point groups, 21 of them do not have a center of symmetry, and 20 are determined piezoelectric, which are 1, 2, m, 222, mm2, 4, -4, 422, 4 mm, -42 m, 3, 432, 3 m, 6, -6, 622, 6 mm, -62 m, 23, -43 m. Note that although it lacks a symmetry center, cubic class 432 is not piezoelectric because of its cubic symmetry. The absence of a symmetry center in these groups represents that the net movement of cations and anions as a result of stress induces a non-zero electric dipole moment in the structure. However, a piezoelectric material with randomly oriented domains is piezoelectrically inactive. In response to this, "poling" is a common method to orient the domains in the piezoelectric material by applying a static electric field to the material such that the domains rotate and switch in the direction of the electric field. During the process, the expansion and contraction of the material along the field axis and perpendicular to the field axis is obtained, respectively, as shown in FIGS. 6 and 7.

Figure 8:
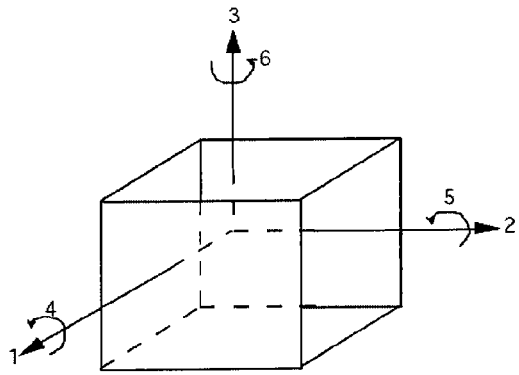
FIG. 8 is a schematic view illustrating the location and direction of reference axis used in determining strain and electrical displacement in piezoelectric materials.

When expressing the piezoelectricity in constitutive equation, the changes of strain and electrical displacement must be considered, which both are orientation-dependent. Therefore, tensor notation is used and the reference axes are indicated in FIG. 8.

It is known that the strain and stress are described by second rank tensors $S_{ij}$ and $T_{ij}$, respectively. The relationship between electric field, $E_j$ and the electric displacement $D_i$ is the permittivity $\epsilon_{ij}$. The piezoelectric equations can be written as:

$$D_i = \epsilon_{ij}^T E_j + D_{ijk} T_{jk}$$

$$S_{ij} = d_{ijk} D_k + s_{ijk}^E T_{jk}$$

where $d_{ijk}$ is piezoelectric constant. Superscripts T and E denote the condition of constant stress and constant electric field, respectively. A conventional method to describe the crystal symmetry and the choice of reference axes (FIG. 8) is to define the poling direction as the 3-axis, the shear planes are indicated by the subscripts 4, 5 and 6 and are perpendicular to directions 1, 2, and 3, respectively. For example, a 3-subscripte tensor notation (i, j, k=1, 2, 3) can be reduced to a 2-subscripte matrix (i=1, 2, 3 and j=1, 2, 3, 4, 5, 6), and a 2-subscripte tensor notation (i, j=1, 2, 3) is simplified to a 1-subscripte notation (i=1, 2, 3, 4, 5, 6). Besides, the first subscript of the piezoelectric constant represents the dielectric displacement and the second gives the component of mechanical deformation or stress. For example, $d_{33}$ indicates an electric field parallel to the poling 3-axis with axial stress along the 1-axis.

It is also known that a piezoelectric ceramic material has only one type of piezoelectric matrix regardless of the symmetry of the constituent crystals. By applying the poling, the initially isotropic status of the ceramic can be destroyed leading to a transversely isotropic state, i.e., the dipoles become oriented in a direction perpendicular to the poling direction. The symmetry elements are now in an infinite order of rotation with the axis of poling direction and an infinite set of planes parallel to the polar axis, which can be described as ∞ m m. The elastic, dielectric and piezoelectric matrices for cylindrical symmetry of poled PZT are shown in the equation below:

$$\begin{pmatrix} s_{11} & s_{12} & s_{13} & 0 & 0 & 0 \\ s_{12} & s_{11} & s_{13} & 0 & 0 & 0 \\ s_{13} & s_{13} & s_{33} & 0 & 0 & 0 \\ 0 & 0 & 0 & s_{44} & 0 & 0 \\ 0 & 0 & 0 & 0 & s_{44} & 0 \\ 0 & 0 & 0 & 0 & 0 & 2(s_{11}-s_{12}) \end{pmatrix}$$

$$\begin{pmatrix} \varepsilon_1 & 0 & 0 \\ 0 & \varepsilon_1 & 0 \\ 0 & 0 & \varepsilon_3 \end{pmatrix}$$

$$\begin{pmatrix} 0 & 0 & 0 & 0 & d_{15} & 0 \\ 0 & 0 & 0 & d_{15} & 0 & 0 \\ d_{31} & d_{31} & d_{33} & 0 & 0 & 0 \end{pmatrix}$$

By having piezoelectric equations and the matrices above, the piezoelectricity of a poled ceramics can be described as:

$$D_1 = \varepsilon_1 E_1 + d_{15} T_5$$

$$D_2 = \varepsilon_2 E_2 + d_{15} T_4$$

$$D_3 = \varepsilon_3 E_1 + d_{31}(T_1+T_2) + d_{33} T_3$$

$$S_1 = s_{11}^E T_1 + s_{12}^E T_2 + S_{13}^E T_3 + d_{31} E_3$$

$$S_2 = s_{11}^E T_2 + s_{12}^E T_1 + S_{13}^E T_3 + d_{31} E_3$$

$$S_3 = s_{13}^E (T_1+T_2) + s_{33}^E T_{31} + d_{33} E_3$$

$$S_4 = s_{44}^E T_4 + d_{15} E_2$$

$$S_5 = s_{44}^E T_5 + d_{15} E_1$$

$$S_6 = s_{66}^E T_6$$

When considering the electromechanical effects of a piezoelectric material, the parameters that are of interest are 1) piezoelectric charge coefficient ($d_{31}$ and $d_{33}$), 2) piezoelectric voltage coefficient ($g_{31}$ and $g_{33}$) the piezoelectric coupling factors ($k_{31}$, $k_{33}$, $k_p$, and $k_t$). The d-coefficient is defined as the constant between electric displacement and stress, or strain and electric field. The piezoelectric charge and voltage coefficient are related to each other by:

$$d_{mi} = \varepsilon_{nm}^T g_{ni}$$

where m, n=1, 2, 3 and i=1, 2, ... 6. High d-value materials are used for actuators, and high g-value materials are applied in sensors.

A common method to measure the piezoelectric properties is known as the "direct method", in which a defined input (i.e. electric field or force) is applied to the sample, and the corresponding output is measured (i.e. deformation or charge). Displacement measurements are used to determine the magnitude and sign of the relationship between applied electric field and the strain developed (converse effect). Based on the equations above, when the sample is free to expand (or stress $T_k$=0), the strain will be only a function of the applied field $D_i$ and the piezoelectric constant $d_{ij}$ can be found:

$$S_j = d_{ij} E_i$$

This equation means that by having a strain versus electric filed diagram, the slope of the plot yields an average value of $d_{ij}$.

Furthermore, concerning the direct method, an alternative way to measure the piezoelectric constants is based on the direct piezoelectric effect. In this method, a known load is either applied on or released from a sample at rest. The resulting charge is then recorded as a voltage across a capacitor (in parallel with the sample). Since the electric filed $E_i$ is 0, the relationship can be simplified as:

$$D_i = d_{ij} T_j$$

such that, by knowing the applied stress and measuring the electric displacement, the piezoelectric constant can be determined.

Experimental

Synthesis of $TiO_2$

The $TiO_2$ used was synthesized by mixing titanium (iv) n-butoxide (Ti—$(OC_4H_9)_4$)) with toluene ($C_6H_5CH_3$) and acetic acid ($CH_3COOH$) in a molar ratio of 1:1:1. With a vigorous stirring under standard condition, the final mixture was aged at 80° C. for 27 hours for gelation. Finally, the resulting product was calcined at 500° C. for 4 hours to nucleate and grow the $TiO_2$ particles.

Preparation of Quartz

Quartz powder is obtained by grinding and crushing a naturally available quartz crystal by hand (hand-ground quartz) or by using high energy ball mill machine (ball-milled quartz).

X-Ray Diffraction

For the identification of the products, X-ray diffractometry was conducted using a Scintag Pad V Diffractometer system with a Cu Kα beam (X=0.541 nm).

Transmission Electron Microscopy

Transmission Electron Microscopy (TEM) to determine morphology and electron diffraction of the materials was conducted with a Philips CM 200UT microscope with a spherical aberration coefficient (Cs) of 0.5 mm and a point-to-point resolution of 0.19 nm. The TEM is operated in the High-Resolution Transmission Electron Microscope (HR-TEM) and the Selected-Area Electron Diffraction (SAED) mode at an accelerating voltage of 200 kV.

Scanning Electron Microscopy

Scanning Electron Microscopy (SEM) was conducted with a Hitachi S-3400N variable pressure microscope with a tungsten filament that delivers at least 50 nA of beam current.

UV Spectrophotometry

UV Spectrophotometry was carried out with an ultraviolet-visible spectrometer with diffuse reflectance method, Thermo Evolution-600, where the light path length was 1 cm.

Hydrogen Gas Analysis

The amount of hydrogen gas ($H_2$) produced from water-splitting experiment was monitored using AMETEC Trace Analytical Gas Analyzer, model ta3000, equipped with and Gas Chromatograph (Shimadzu GC-14A with Flame Ionization Detector FID) as well as a Reduction Gas Detector (RGD) sensor for hydrogen detection. Nitrogen gas ($N_2$) of 99.98% purity at a flow rate of 20 cc/min is applied as the carrier gas. The detection limit of this analyzer is 10 ppb hydrogen.

Oxygen Gas Analysis

To monitor the amount of oxygen gas ($O_2$) being produced from the system, the oxygen concentration in solution was monitored as function of time by using Isolated Dissolved Oxygen Meter $ISO_2$ equipped with an OXELP probe (World Precisions Instruments).

Experimental Set-Up

The experiments of water splitting to hydrogen and oxygen were carried out using sealed glass tube and samples in water under a standard condition. Glass tubes a half-inch diameter and one-foot in length were used for the experiment. The reaction cell (glass tube) was filled with nitrogen gas after adding samples of the piezoelectric material being tested. To monitor the hydrogen and oxygen concentration variation, the gas inside the cell was extracted by syringe and inject into the external hydrogen analyzer. Hydrogen and oxygen production kinetics were obtained by calculating the evolved hydrogen concentration as a function time.

Figure 9:
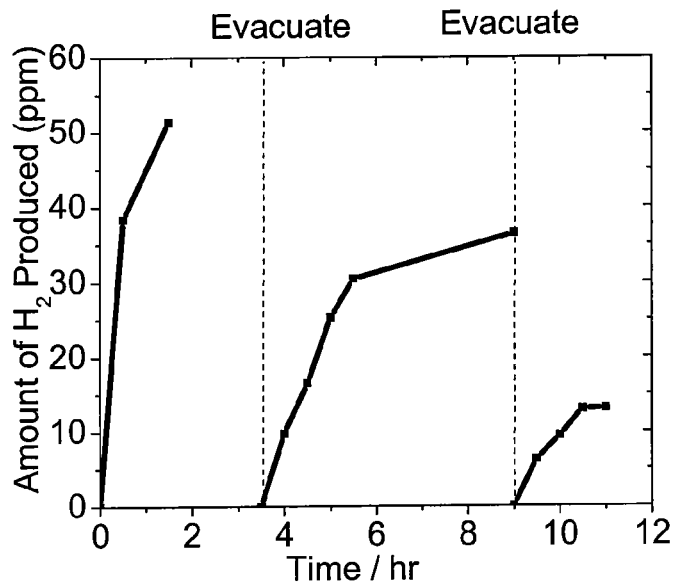
FIG. 9 is a graph of hydrogen production from quartz in water under UV irradiated and non-irradiated conditions.

The results of strained induced reaction are shown in FIG. 9, in which the evolution of $H_2$ from pure water containing suspension of ball-milled quartz powders under a condition with and without UV irradiation. It is found the quartz powders were active when there was photon energy provided. The initial rate of $H_2$ evolution was about 76.7 $ppmh^{-1}$. The reaction reached to its maximum after 2 hours due to the glass tube volume limitation. Note that the rapid decrement of the production rate along with the large error bar might caused by instrument saturation (identified in FIG. 9 by the question mark (?)). After evacuating the reaction system and re-running the experiment (identified by the dashed line in FIG. 9), the hydrogen evolution rate was then found at 51.3 $ppmh^{-1}$, and again the reaction reached the plateau after about 2 hours. After another gas evacuation at $9^{th}$ hour and re-running the experiment, the hydrogen evolution rate of 8.45 $ppmh^{-1}$ was obtained. Amazingly, on the other hand, when the UV light was removed, we still detected hydrogen gas from the system, indicating that the reaction remained active without UV irradiation. For example, almost the identical initial $H_2$ evolution rate at 74.9 $ppmh^{-1}$ was observed for the quartz samples under dark condition. Similar gas production rates were achieved for both UV and dark condition in the second as well as the third run, suggesting that the catalytic activity was triggered by a factor other than photo energy.

Figure 10:
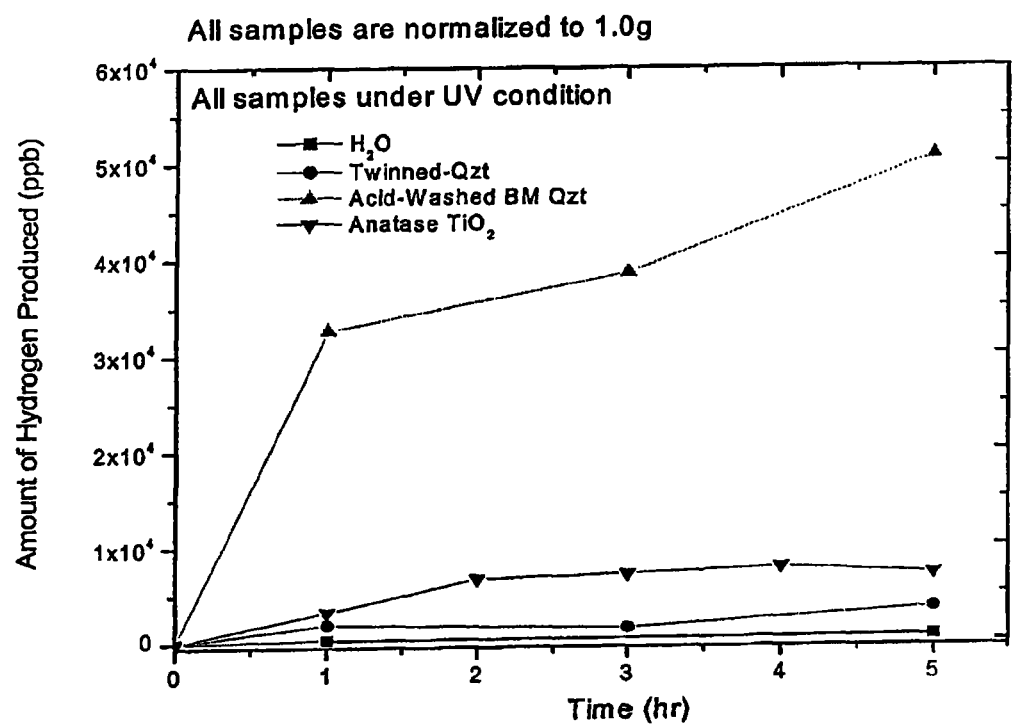
FIG. 10 is a graph of hydrogen production from various materials in water under UV irradiated conditions.

Factors that influenced the gas evolution of quartz in water were further investigated using quartz with different treatments, the results of which are illustrated in FIG. 10. As a comparison, the hydrogen production performance of HCl-washed-quartz powders was also measured using the same method. The purpose of using HCl was to remove possible impurities and Fe on the quartz surface. The initial gas production rate was found at 74.5 $ppmh^{-1}$ (76.7 $ppmh^{-1}$ for no HCl treatment), which has no significant different from that of quartz without any treatments. After evacuation and re-running the measurement (illustrated by the dashed line in FIG. 10), the hydrogen production rate of acid washed quartz was found at 12.9 $ppmh^{-1}$ (15.3 $ppmh^{-1}$ for no HCl treatment). A small decrease in the gas production rate of acid washed quartz under dark condition comparing to that of no treatment quartz can be explained by the quartz surface damages caused by HCl. However, the results are in good agreement with the observation of hydrogen production performance by ball-milled quartz under UV and dark conditions.

Figure 11:
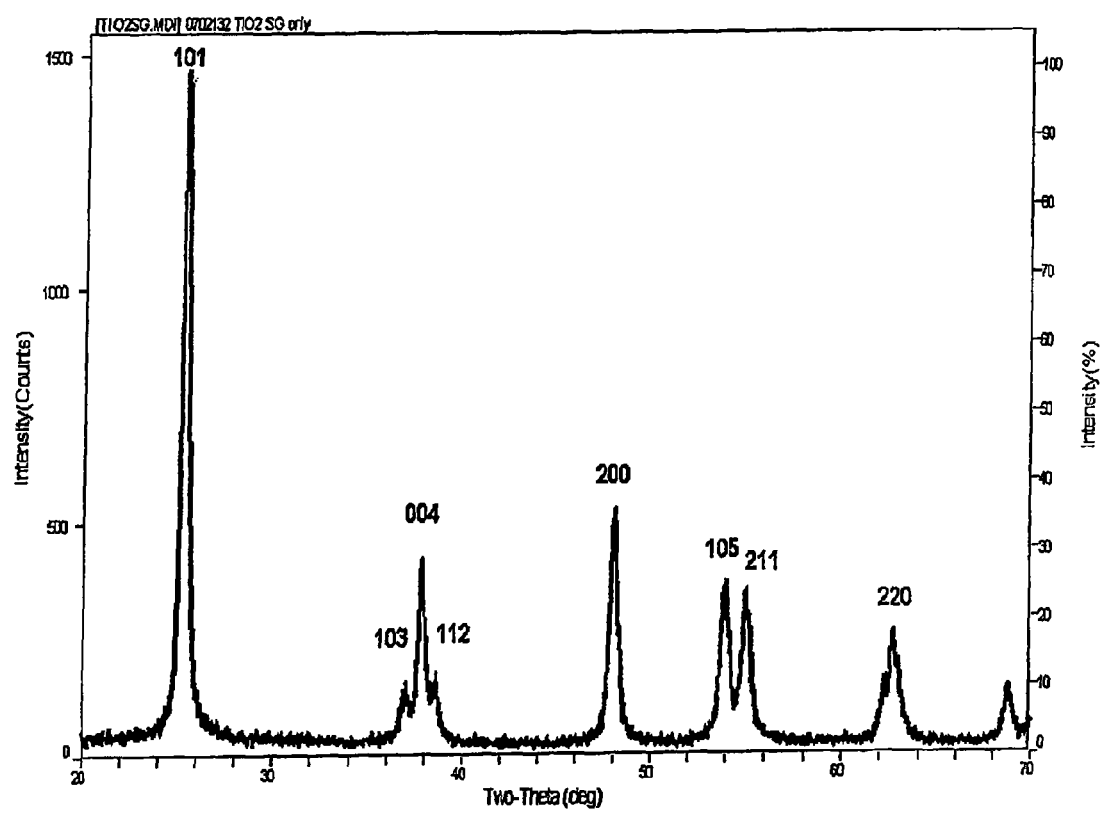
FIG. 11 is an X-ray diffraction pattern of anatase titanium dioxide.

In contrast, a system that contained no quartz was utilized for a control experiment. Predictably, this system produced no hydrogen because absence of the catalyst in the system as the production of hydrogen is the result of a non-spontaneous reaction. The photoactivity of synthetic $TiO_2$ (produced by the sol-gel method) is also included in the plot for comparison. Note that the $TiO_2$ here contains a single phase of anatase (FIG. 11), which is generally believed has the best photoactivity for direct-water-splitting. Compared with quartz, however, anatase $TiO_2$ had a hydrogen production rate at 3 $qippmh^{-1}$, which was much lower than that of ball-milled quartz. Furthermore, $TiO_2$ became inactive in water for catalyzing the redox reaction once the UV light was removed.

Interestingly, no hydrogen production, or only a very small amount of hydrogen was detected for the case of twinned quartz suspension in water (FIG. 10). To investigate the reduction in the activity of twinned quartz, the structure of the twinned quartz was analyzed in more detail.

Figure 12A:
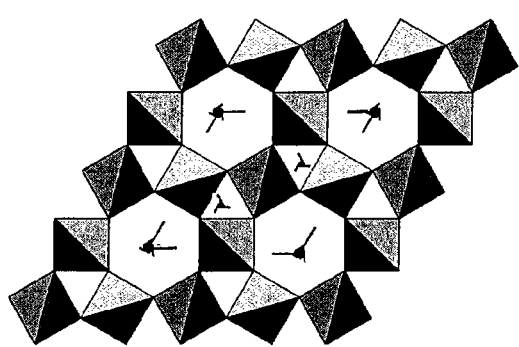
FIGS. 12A-12B are schematic views of α-quartz and β-quartz along the c-axis.
Figure 12B:
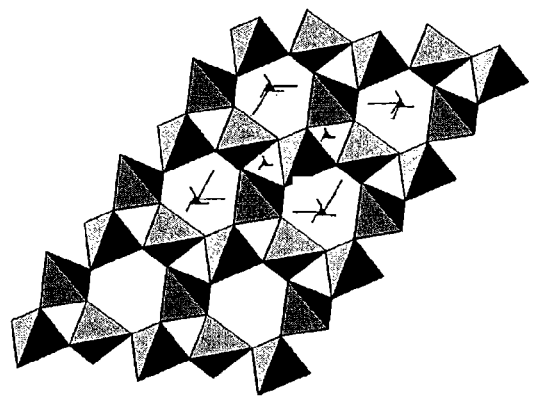
Figure 13:
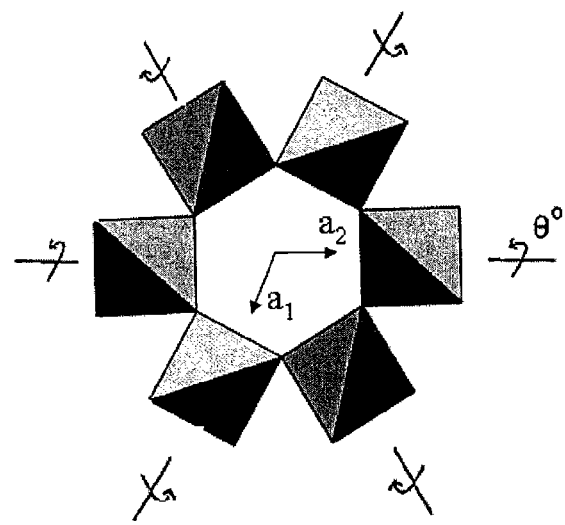
FIG. 13 is a schematic view of a hexagonal spiral β-quartz structure.

The structure of α-quartz (or low quartz) can be treated as a distortion of high-temperature β-quartz (or high-quartz). In β-quartz, paired helical chains of $SiO_2$ tetrahedral spiral in the same sense around $6_4$ or $6_2$ screw axes parallel to c (FIG. 12). Twofold rotation symmetry within the sixfold screw is found between the two helical chins. The intertwined chains produce open channels parallel to c that appear hexagonal in projection. The space group of β-quartz is either $P6_422$ or $P6_222$ depending on the handeness of the tetrahedral helices. When β-quartz is cooled below its transition temperature at 1 bar, the expanded β-quartz framework collapses to the denser α-quartz configuration, and the Si—O—Si bond angle decreased from 150.90 at 590° C. to 143.60 at room temperature. The contraction of the tetrahedral can be described as the rotation of rigid tetrahedral about <100> axes through an angle θ. Note that θ is zero in β-quartz and θ is 16.30 in α-quartz at room temperature. Based on FIG. 13, this rotation violates the twofold symmetry contained within the sixfold screw axes, and the space group symmetry decreases from $P6_422$ to its subgroup $P3_121$ (or from $P6_222$ to $P3_221$).

Figure 14:
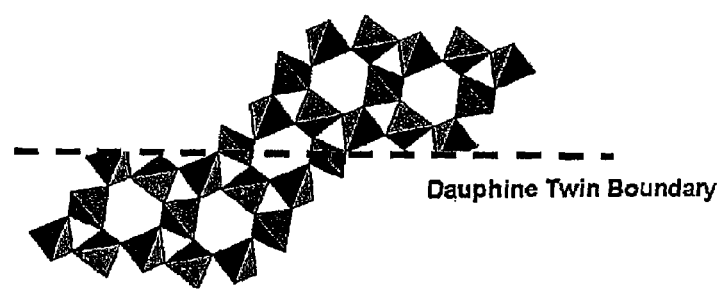
FIG. 14 is a schematic view of a Dauphine twin boundary in low quartz.

The α-β quartz transformation yields two distinct left and right twin orientation because the tetrahedral rotation may occur in one of two senses. These two orientations are related to each other by the twofold symmetry lost during the transformation. These two equivalent twin-related orientational variants, which related each other by 180°, are named Dauphine twinning. FIG. 14 shows structure of a single twin boundary.

In Dauphine twinning, the quartz now becomes ditrigonal with a threefold symmetry (FIG. 14), and the electrically polarized diad axes normal to the c-axis in the two Dauphine twin orientations are rotated 180° relative to each other. As a result, the piezoelectric charges induced in one set of twins by compression normal to c will cancel the electric charges built up in the other. This piezoelectricity cancellation by Dauphine twinning in quartz explains why a large amount of hydrogen production for the twinned quartz was not observed similar to that for the ball-milled quartz. The Dauphine twin boundary is consisted of a gradual change in the tetrahedral tilt angle θ from +16.3° to −16.3°.

Based on the preparation method, the heating history of the twinned quartz was first at room temperature, and then heated at 700° C. for 5 hours followed by cooling in air till room temperature again. Accordingly, the phase of quartz varied from α-phase at room temperature to β-phase at 700° C., then back to α-phase when cooling. From the discussions above, when phase transformation of β→α occurred on cooling, two twin-related α-phases are formed, leading to the Dauphine twinning effect in which the piezoelectric properties of α-quartz is now disappeared. In particular, when the twinned quartz is placed in contact with water, based on the above observations, only a very small amount or no hydrogen gas is produced; compared to the ball-milled quartz, which also contained also α-phase only, but maintained a piezoelectric property, resulting in hydrogen production of 76.7 ppmh$^{-1}$. These observations are applicable in both UV-illuminated and dark conditions.

In this set of experiments, the observation of large quantities of hydrogen production in both acid- and non-acid treated ball-milled quartz was confirmed. A much lower hydrogen production rate was obtained for the quartz sample without piezoelectric property.

Figure 15:
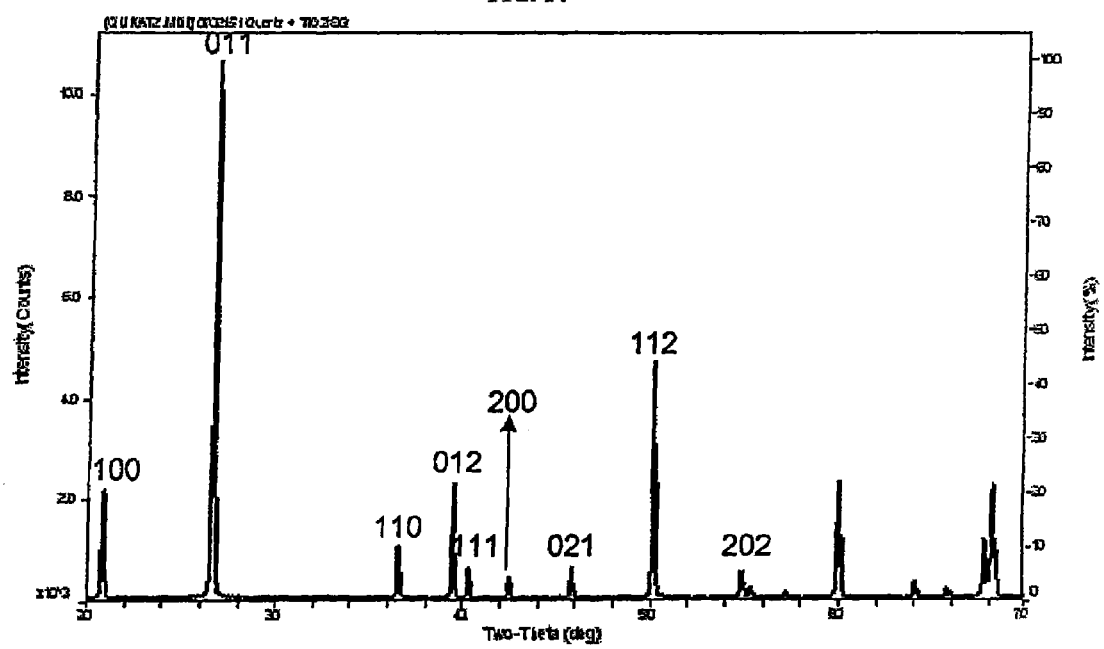
FIG. 15 is an X-ray diffraction pattern of ball-milled quartz.

In order to obtain more insights about the morphology and the factors that lead to the $H_2$ evolution, XRD and TEM analysis was performed. X-ray diffraction pattern of the ball-milled quartz sample are shown in FIG. 15. The diffraction peaks are indexed according to the values reported in JCPDS card No. 25-1353. Form the pattern, it can be seen that the quartz is phase pure containing no impurities. Note that both ball-milled and none-ball-milled α-quartz exhibited identical diffraction peaks, thus the XRD pattern of ball-milled quartz fits perfectly to the XRD pattern of the α-phase.

FIGS. 16A-16B show the TEM images of the ball-milled quartz. After high energy ball milling, the creation of defects on the quartz grains can be clearly observed as the small dots in these figures. These defects deformed the quartz grains, and thus the defects can be treated similarly to or as locally applied external forces on the quartz grains. Furthermore, as explained previously, due to the lack of a symmetry center in quartz, any applied mechanical force on quartz, such as the defects, will cause a build up of charge on the surface and generate an electric potential (piezoelectric effect). In this case, the ball-milling defect induces a charge build up and potential difference on the quartz crystal surface in manner similar to that created when an external mechanical force is applied to the quartz. As a result, when water is positioned in contact with a quartz surface, the induced potential acts as a chemical driving force for the reduction reaction of water, resulting in the generation of hydrogen gases, which forms a new mechanism for direct water splitting in which the mechanical force (deformation) transformed directly into chemical force (splitting of water). This phenomenon explains the observations of large amount of hydrogen evolution of quartz suspension in water, which is independent of photo energy provided.

As illustrated in FIG. 10, twin-phase quartz powders did not have any activity for hydrogen generation. This is has been determined to be because the piezoelectric property of the quartz material was canceling out due to the twining effect, in which the overall quartz particles became charge neutral. Because of that, twin-phase quartz can no longer build up charges on the surface. As a result, when twin-phase quartz powders were suspended in water, they do not have sufficient driving force to reduce water in to hydrogen gas. This leads to the observations of small or no hydrogen production for the trials. For the HCl-washed trials, the acid only removes the impurities or Fe on the surface, but does not change any piezoelectric properties of quartz. Therefore, we were still able to detect large amount of the hydrogen from the trials of HCl-treated quartz suspensions in water. More importantly, in our system the illumination of light no longer plays a dominant role for reduction of water, which not only successfully overcomes the limitation of light-harvesting problem under UV and visible light, but also results in a system that is able to catalyze the reaction without any light energy.

As additional support for these findings, the hydrogen production reaction of ZnO suspension in water was also tested, the results of which are illustrated in FIG. 17. ZnO is a well known piezoelectric material and has been reported as being successfully used in as a nano-generator.

For the verification experiments, ball-milled ZnO powders were prepared similarly to the quartz powders tested above, with hand-ground ZnO powder samples used as a control experiment. From the data in FIG. 1, it was found that, under dark conditions, the hydrogen production rate of ball-milled ZnO is almost 12.5 times greater than that of hand-ground ZnO, at 2.39 ppmh$^{-1}$ and 0.19 ppmh$^{-1}$, respectively. Thus, these results confirm that, because the ball-milled ZnO grains contain many defects resulting from the method of their production, these defects allowed the build up of electric potentials on the surface of the grains. The induced electric potential on the surface was then transformed into a chemical driving force for the hydrogen production once the water was in contact with the ZnO powders. In contrast, the hand-ground ZnO powders has much lower production rate is because the grains did not contain as many defects as the ball-milled ZnO, resulting in a smaller amount of mechanical energy being transformed into chemical energy.

Figure 18:
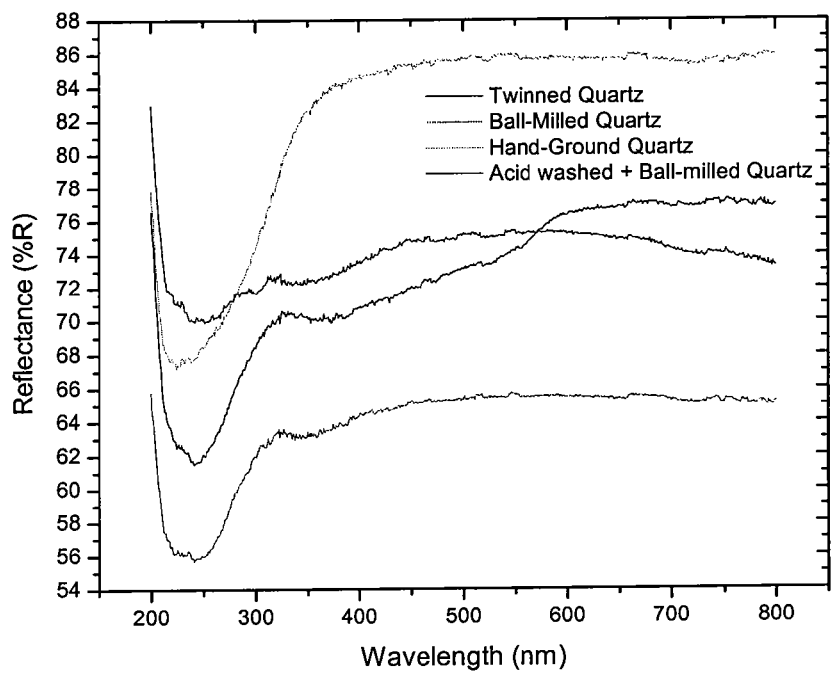
FIG. 18 is a graph of the spectra of various quartz powders.

FIG. 18 shows the diffuse reflectance UV-Vis spectra of the quartz with various treatments including ball-milled quartz (α-phase), hand-ground quartz (α-phase), twinned quartz, and HCl-treated ball-milled quartz. All the quartz samples after treatment were white in color, had high reflectance to visible light, and had absorption of UV light at wavelengths at around 250 nm. The hand-ground quartz powders had high reflectance of wavelengths longer than 350 nm. Conversely, all the samples that were ball-milled (including acid treatment) revealed absorption at and around 360 nm. The absorption at around 360 nm is believed to be caused by local linear defects in the crystal that were created by high energy ball-milling.

Furthermore, concerning twinned quartz, an additional absorption shoulder at 550 nm was found. Integration of the twin boundary and variations of the defect density in the crystal are believed to be the factor that influenced the absorption at 550 nm. However, the illumination of light here does not play a critical role in a piezocatalytic reaction, because the transformation of the mechanical energy into the chemical driving force is the focus, such that only the piezoelectric properties of the catalyst determine if the reaction can be catalyzed by the material or not. For example, although twin-phase quartz has additional absorption at wavelength of 560 nm (FIG. 18), without the piezocatalytic effect, the hydrogen production outcome is still negligible (FIG. 10).

Theory of Piezoelectrochemical Effect Concerning the form and ability of piezoelectric materials, such as quartz, ZnO and $BaTiO_3$, to produce or catalyze the hydrogen production reaction in an aqueous environment, because the charge that initiates the reaction is localized on the exterior surface of the material, it is desirable to maximize the surface area of these materials to consequently maximize the area available for charge build up and reaction initiation. Further, while the cause for the charge build up in these piezoelectric materials has been determined to be the result of the defects formed in the materials, because the defects are considered to function identically to mechanical forces acting on the piezoelectric materials, the surface charge on these materials can also be created through the direct application of suitable mechanical force to the material within the aqueous environment.

To maximize the available surface area of the material, there are methods currently available for synthesizing nano-fibers of the various piezoelectric materials. The advantage is that the piezoelectric material nano-fibers have extremely high flexibility and large surface area, leading to great amount of chemical potential for splitting of water.

Figure 19A:
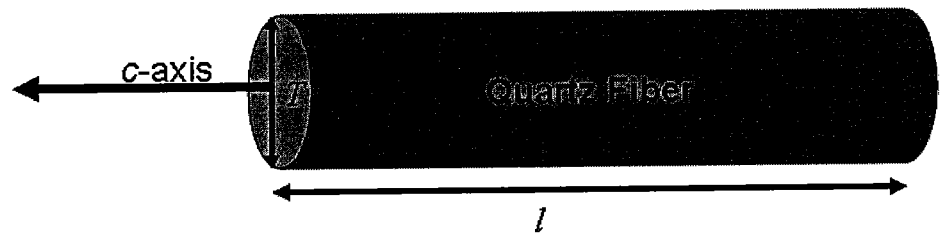
FIGS. 19A-19F are schematic views of the geometry and bending of piezoelectric material fibers.
Figure 19B:
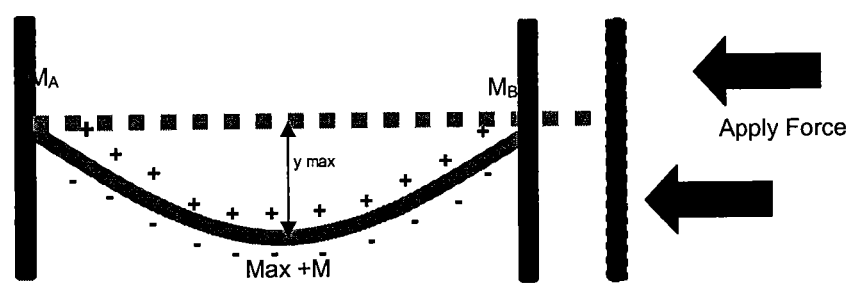
Figure 19C:
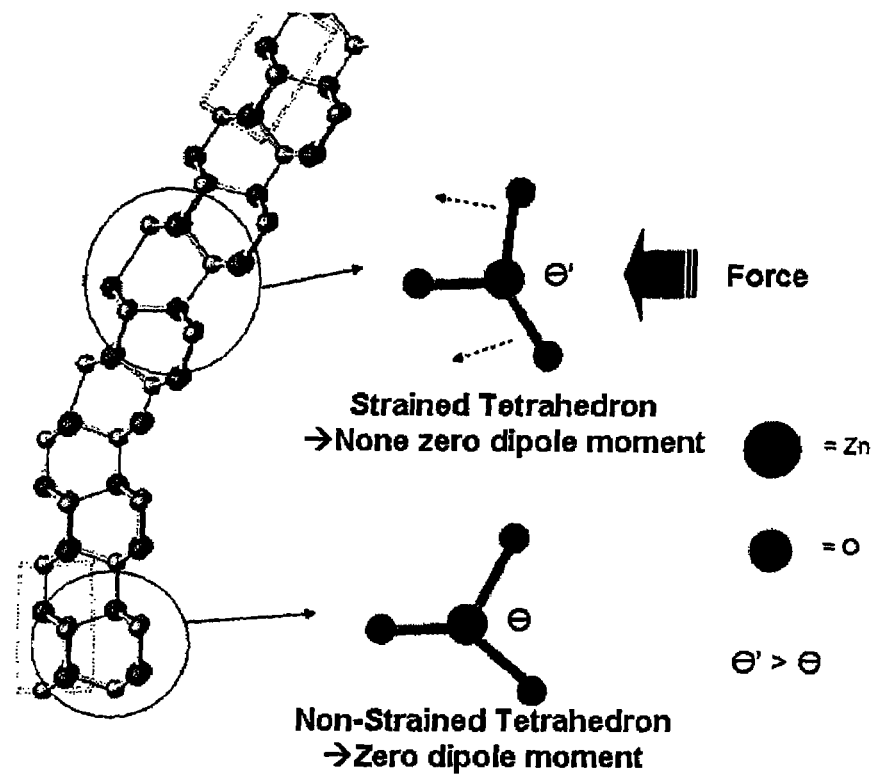
Figure 19D:
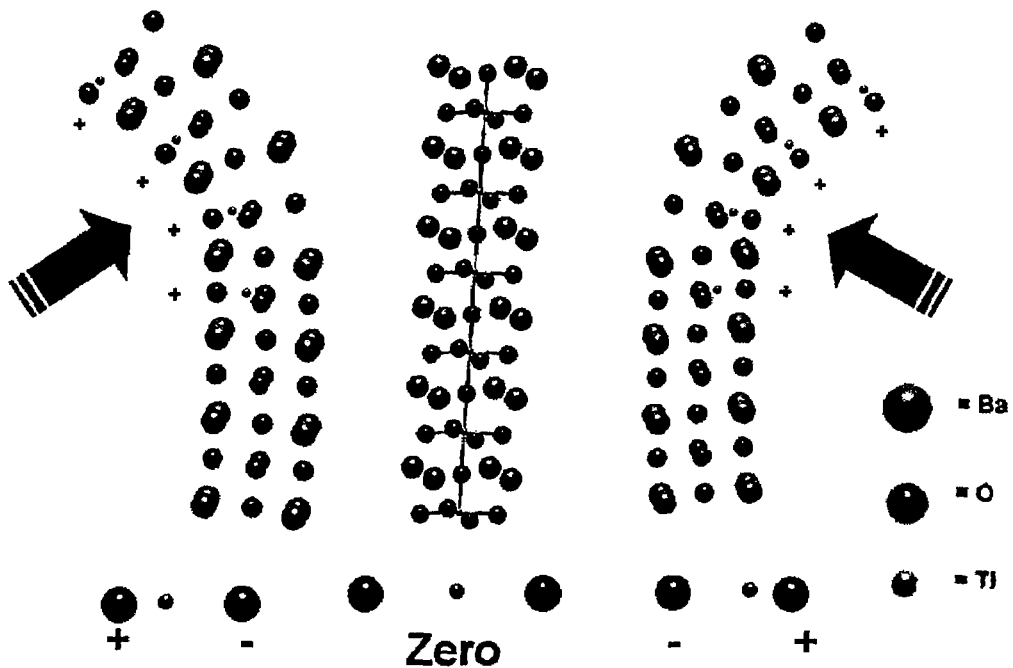
Figure 19E:
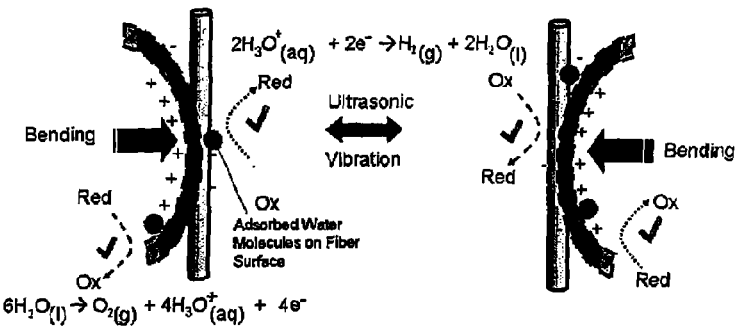
Figure 19F:
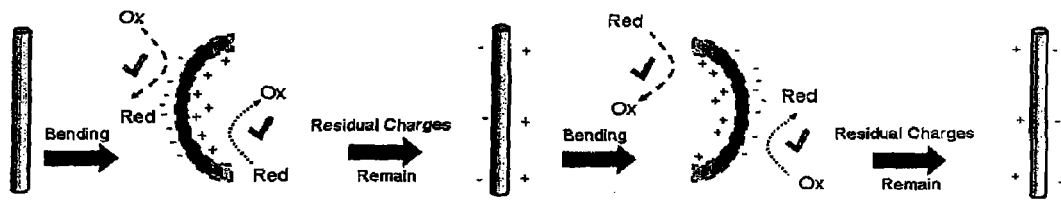
Figure 20:
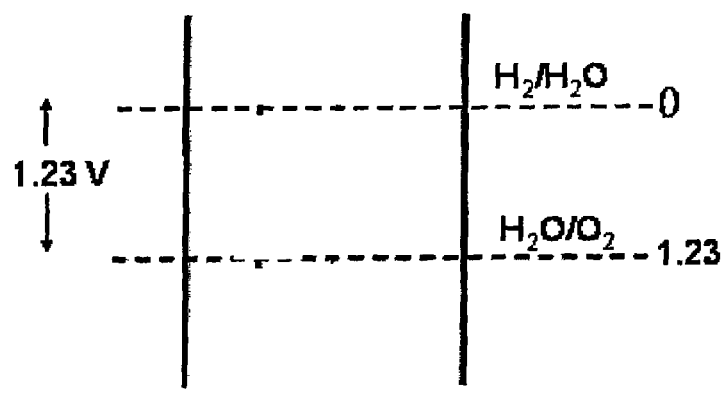
FIG. 20 is a schematic view of the electrical redox potential of water.
Figure 21:
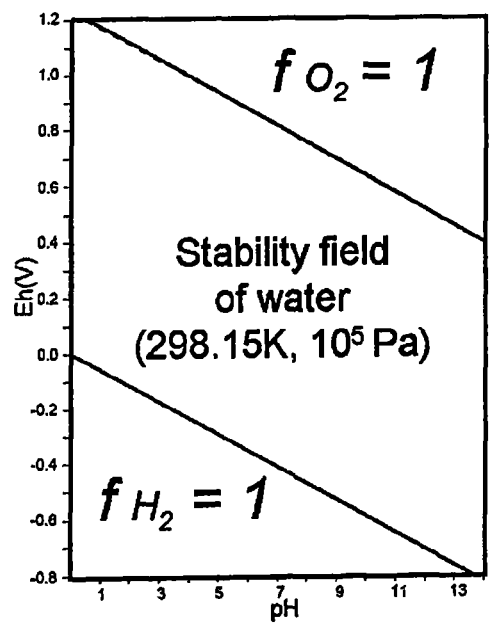
FIG. 21 is an Eh-pH diagram showing the stability field of water

The physics and chemistry of generating hydrogen and oxygen gases from pure water arises from the combination of the piezoelectric properties of certain piezoelectric materials, such as $SiO_2$, $ZnO$ and $BaTiO_3$, and the redox reaction of water. The piezoelectricity of each material arises from the lack of inversion symmetry in their crystal structures. Any deformation or strain acting on the material, such as the deformation of the Si—O structure (FIGS. 19A-19B), Zn—O tetrahedra (FIG. 19C), or the relative Ti—O positions of $BaTiO_3$ (FIG. 19D), will cause a non-zero dipole moment in the crystal lattice. Consequently, strain-induced electrons migrate through the bulk material and a charge potential is produced on the surface of the material. Specific morphological aspects of $SiO_2$, $ZnO$ and $BaTiO_3$ such as fibers and dendrites will acquire electric potentials on their surfaces if an external mechanical energy is applied that results in a bending (deformation) of the fiber or dendrite. The strain-induced electric potential formed on the fiber or dendritic surface in wet conditions (i.e. in pure water) is available for the reduction and oxidation reaction via charge transfer to species such as water molecules adsorbed on the surface (FIG. 19E). Note that the developed potential must be greater than the standard redox potential of water (1.23 eV) to make electrons available to initiate the redox reaction in this experiment (FIGS. 20-21). Residual charges or potentials lower than 1.23 eV will not participate in reactions to form $H_2$ and $O_2$ from water (FIG. 19F).

Alpha quartz with its unique piezoelectrochemical property is one potential material for direct-water-splitting for hydrogen production. The possible voltage that is generated by applying an external force on the quartz can be calculated as follows. First, assume a quartz sample has a beam-like geometry with a diameter T, and length, l, as shown in FIG. 19A. Considering the quartz fiber is under a two-end-fixed condition with proper alignment and applied force as in FIG. 19B, the maximum deflection (y) and the bending moment on the quartz fiber as a function of applied force can be calculated as:

$$y = \frac{2W(l-a)^2 a^3}{3EI(l+2a)^2}$$

$$\text{at } x = \frac{2al}{(l+2a)^2} \text{ if } a > 1/2$$

$$\text{Maximum possible value} = \frac{Wl^3}{192EI}$$

$$\text{when } x = a = \frac{l}{a}$$

$$\text{Maximum Bending Moment} = M_{max} = \frac{Wl}{8}$$

where W=applied force; l=fiber length; a=reference point; E=modulus of elasticity of the fiber materials; I=moment of inertial.

Therefore, by having the maximum deflection and bending moment, the maximum local stress, radius of curvature, and output voltage from the piezoelectric effect of quartz can be found as follows:

$$\sigma = \frac{Mz}{I}$$

$$R = \frac{EI}{M}$$

$$V^{\pm} = \pm \frac{3Ty_m}{4Ld}$$

where $\sigma$=stress, M=$M_{Max}$ (in Eq.4.4); z=fiber radius; T=fiber diameter; $y_m$=maximum deflection from equation above; d=piezoelectric constant of quartz=(2.3 μm/V).

Table 5 below lists the values of induced possible maximum voltage by deflecting the quartz fiber with various radius and lengths when $1\times10^{-5}$ N is applied.

TABLE 5

Theoretical values of maximum defection and induced potential quartz fibers with different dimensions

| Fiber Dim. | Young's Mod. (Pa) | Radius (m) | Length (m) | Density (kg/m3) | Vol. (m3) | Mass (kg) | Area inertia (X-sect) | Max. def. (m) | Max. Ind. Pot. (±V) |
|---|---|---|---|---|---|---|---|---|---|
| mm-level | 1.05E+11 | 1.00E−02 | 1.00E−01 | 2.67E+03 | 3.14E−05 | 8.37E−02 | 4.19E−06 | 1.19E−16 | 7.74E−06 |
| μm-level | 1.05E+11 | 1.00E−05 | 1.00E−04 | 2.67E+03 | 3.14E−14 | 8.37E−11 | 4.19E−21 | 1.19E−10 | 7.74E+00 |
| nm-level | 1.05E+11 | 1.00E−08 | 1.00E−07 | 2.67E+03 | 3.14E−23 | 8.37E−20 | 4.19E−36 | 1.19E−04 | 7.74E+06 |

*Assume $1 \times 10^{-5}$ N force is applied

Figure 22:
FIG. 22 is a photomicrograph of nanoscale quartz fibers.

From Table 5, it is found that when a quartz fiber is in mm-scale, the maximum induced potential with $1\times10^{-5}$ N of force applied is only about $7.74\times10^{-6}$ V, which is impossible for the required redox potential of water at 1.23 V (FIG. 22), thus no hydrogen production. However, by scaling down the quartz fiber to μm-scale (aspect ratio remained unchanged), the maximum defection becomes much greater, leading to a possible potential of ~7.74 V and driving the direct-water-splitting process. These calculations match our observations on the quartz suspension for generation of hydrogen, and describe the basic physics of the piezoelectrochemical effect (PZEC).

Furthermore for example, considering a case of generating ±10.0 V is needed; the table blow (Table 6) shows the required deflection, bending moment, force, and radius of curvature by using quartz fibers in different scale.

TABLE 6

Theoretical values of deflection, force, bending moment, and radius of curvature for generating 10.0 V of potential on quartz fibers with different scale-level

|  | Required Deflection (m) | Required Force(N) | Required Bending Moment (Nm) |
| --- | --- | --- | --- |
| mm-level | 1.53E−10 | 2.02E−01 | 2.52E−03 |
| micron-level | 1.53E−10 | 2.02E−07 | 2.52E−12 |
| nm-level | 1.53E−10 | 2.02E−13 | 2.52E−21 |

Based on the above, it is believed that: (1) the nano-meter scale quartz fiber with greater amount of deflection and surface area will dramatically improve the hydrogen production rate from water; (2) a stoichiometric amount of oxygen will be produced in the piezoelectrochemcial reaction; (3) kinetics and other factors control the direct splitting of water via piezoelectrochemical effect; and (4) a quartz fiber with piezoelectrochemical properties will also be able to be applied to initiate a catalytic oxidation reaction, such as the oxidation of various organic compounds.

The above results illustrating the increased effectiveness of the quartz in nano-scale fiber form over other forms also should hold true for nano-fibers formed from other suitable piezoelectric materials.

Fabrication of Piezoelectric Material Nano-Fibers

1. Quartz Fibers

Figure 23:
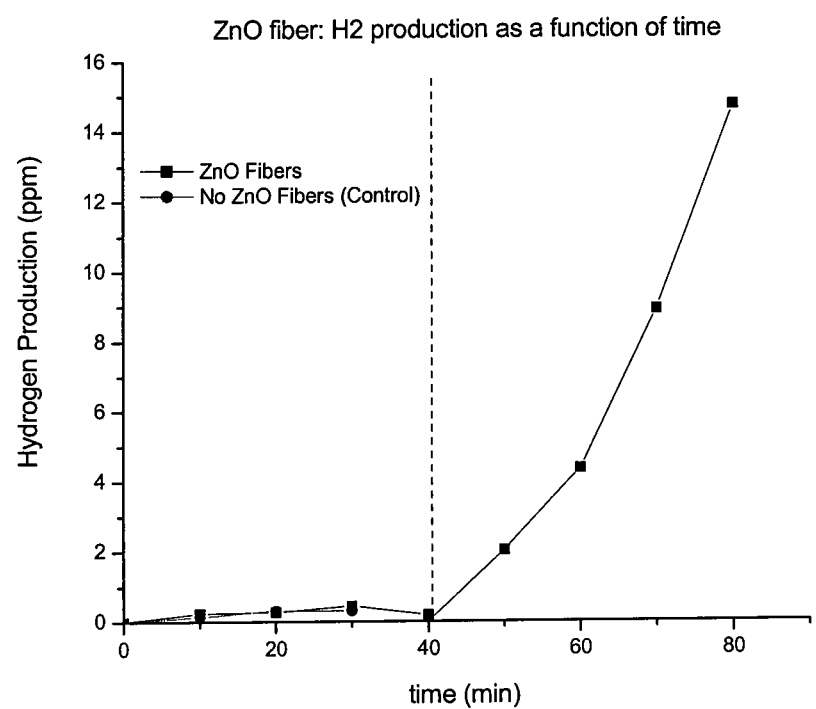
FIG. 23 is a graph of hydrogen production from zinc oxide fibers in water that is subjected to ultrasonic vibrations.

In one exemplary method, the quartz fibers are prepared by using an ultra-microtome to cut a natural quartz crystal at a high cutting speed. In doing so, the quartz fibers can be prepared and align in different orientations by various cutting directions and speeds for improved surface area, mechanical properties, and piezoelectrochemical effect. FIG. 23 shows the quartz fibers prepared by ultra-microtome cutting in a fabric-like network. The quartz fibers are much more durable than normal quartz crystals in macroscopic scale because interlocked quartz nano-fibers are much less brittle due to its dimensions. This results a dramatic improvement on surface area and possible induced potential (thus piezoelectrochemical properties) for splitting the waters.

All the quartz nano-fibers can be characterized using X-ray diffraction, Scanning Electron Microscopy (SEM), Transmission Electron Microscopy (TEM) and associated techniques (like nano-diffraction and electron energy-loss spectroscopy) to determine the structure and chemistry of the nano-fibers while the effective surface area can be characterized using BET and BJH methods.

2. $BaTiO_3$ Dendrites

The $BaTiO_3$ dendrite samples (FIGS. 24-26 and 29) of the PZEC catalyst were synthesized by a hydrothermal method. All the chemicals that were used as starting materials had a purity of 99.99%. The precursor $Ti(OH)_4$ was prepared by adding 25 mL of $Ti(OC_2H_5)_4$ drop-wise into 1.0M of acetic acid. The solution was settled allowing the precipitate to form in 72 hours and followed by rinsing the product with DI water and drying at 60° C. The as-synthesized $Ti(OH)_4$ precursor and commercially available $Ba(OH)_2$ $8H_2O$ were then added (Ti:Ba=1:1 in molar ratio) into 0.25M NaOH. After that, the mixture in a Teflon cup with 60% capacity was stirred and sealed tightly in a stainless steel autoclave. The closed bomb (Parr-type) was maintained at 200° C. for 68 hours for hydrothermal reaction. The bomb was then cooled naturally to room temperature. The resulting white precipitate was washed extensively with DI water to remove any adsorbed impurities and finally dried at room temperature.

3. ZnO Fibers

A hydrothermal method was used to synthesize ZnO fibers (FIGS. 27-29). Hexamethylenetetramine ($C_6H_{12}N_4$) and zinc nitrate hexahydrate ($Zn(NO_3)_2.6H_2O$) precursor solutions were mixed together (1:1 molar ratio) in Teflon cup with 60% capacity followed by magnetically stirring in 15 min. The mixture was then sealed tightly in a stainless steel autoclave. The closed bomb was heated at 95° C. for 48 hr. After that the bomb was cooled naturally to room temperature. The final products were washed with DI water and dried at room temperature.

Hydrogen Production from Water Using Ultrasonic Vibrations and Fibers of Piezoelectric Material In support of the above theory, testing was done utilizing zinc oxide (ZnO) micro-fibers synthesized using the bottom-up method (i.e. hydrothermal synthesis method). Nano-fibers of quartz and other materials can be fabricated using photolithography, dry-cutting and other methods, some of which were discussed previously.

The micro-fibers were positioned in a pure water aqueous environment to which a suitable ultrasonic vibration generator was connected in order to direct ultrasonic vibrations at the fibers within the aqueous environment. An identical trial utilizing a similar aqueous environment without any ZnO micro-fibers was also conducted to provide a control for the experiment. Initially, the aqueous environments were left alone in order to measure any hydrogen production from the aqueous environments. This was done for an initial forty (40) minute time period with a suitable hydrogen gas detection device such as described previously used to detect any hydrogen produced by the micro-fiber containing and control aqueous systems. After the initial time period, the ultrasonic vibration generator was activated to direct vibrations through the aqueous environment at the micro-fibers to deflect and "mechanically strain" the micro-fibers. The ultrasonic vibration generator was left active for a second forty (40) minute time period, and the hydrogen production from the system during this period was measured in the same manner as during the initial time period.

The results of this experiment are shown in FIG. 23, in which the evolution of $H_2$ from pure water under an application of ultrasonic waves. As seen in the graph, during the initial forty (40) minute period where the ultrasonic vibration generator inactive, no hydrogen was produced in either the micro-fiber containing or control aqueous environments. Regarding the control system, no hydrogen production was detected during the second time period as well. However, when the ultrasonic generator was activated during the second time period in the system including the ZnO micro-fibers, rapid hydrogen production was obtained at an initial rate of 12.9 ppmh$^{-1}$. This hydrogen gas production upon mechanical vibration of the ZnO micro-fibers in the aqueous environment agrees with the previous experiments, in which the strained ZnO powders were also active to split water into hydrogen and oxygen.

This is because, in a mechanism similar to that caused by the deformation of the structure of ZnO grains by ball milling, with regard to micro- and nano-scale fibers, ZnO fibers will build up electric potentials on the surface through deformation caused as a result in an aqueous environment, the mechanical or strain induced electric potential caused by the vibrations is transformed on the fibers into the chemical energy that is utilized to split water into hydrogen and oxygen gas.

Figure 32:
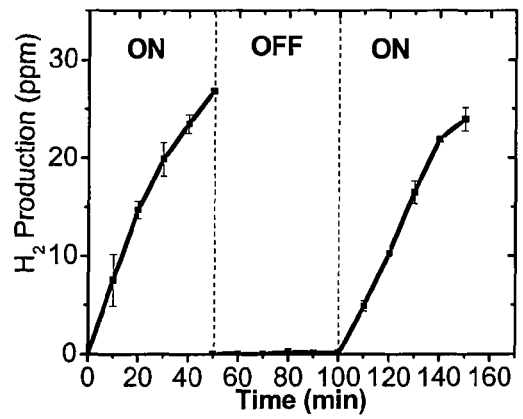
FIG. 32 is a graph illustrating the evolution of $H_2$ performance of as-synthesized

The performance of direct water-splitting was further investigated showing the capabilities of ZnO fibers and $BaTiO_3$ dendrites for scavenging vibrational waste energies from urban environments to generate hydrogen and oxygen gases from pure water. In order to first measure hydrogen gas production, ultrasonic wave vibrations at a frequency of 40 kHz using a Branson 5510-MT Ultrasonic Cleaner were applied to 5.0 mL of DI water in a Pyrex glass tube to determine the results of the piezoelectrochemical effect on as-synthesized ZnO fibers prepared on a Si (100) wafer of 1×1 $cm^2$. The results for hydrogen gas production for the ZnO and the $BaTiO_3$ are shown in FIGS. 30 and 32. A control experiment was also conducted with a cleaned Si wafer (1×1 $cm^2$), without ZnO fibers in the system. In the first period when external vibration was used (0~$40^{th}$ minute), rapid hydrogen production was obtained at an initial rate of $3.4 \times 10^{-3}$ ppm per second (ppm/s). The reaction cell was then evacuated at the $40^{th}$ minute allowing a fresh run beginning at the $41^{st}$ minute. Ultrasonic wave vibration was turned off at the beginning of the $41^{st}$ minute, and the $H_2$ production was measured again. It was found that hydrogen generation stopped when the ultrasonic wave vibration was turned off, leading to a negligible $H_2$ production rate (<0.0001 ppm/s). This is similar to the control experiment (0~$40^{th}$ minute). A possible reason for the low gas concentration in the experiments without ultrasonic vibration or the control experiment could be due to contamination from air in the room.

Figure 31:
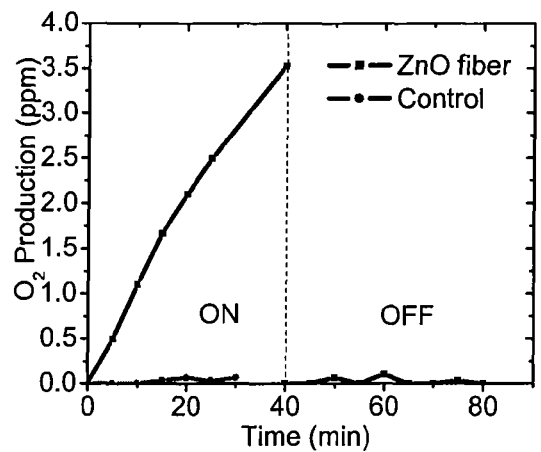
FIG. 31 is a graph illustrating the evolution of $O_2$ as a function of time showing performance of as-synthesized ZnO fibers on Si (100) wafer (1×1 cm²) in water responding to ultrasonic waves.

The oxygen production performance of ZnO fibers via the piezoelectrochemical effect was also investigated. Oxygen concentration was measured in solution as a function of time as shown in FIG. 31. The response of the ZnO fibers to external vibrations was demonstrated by turning the ultrasonic wave in the system on and off. Consistent with the hydrogen production test, when ultrasonic waves were applied to ZnO fibers, oxygen concentration grew rapidly at an initial rate of $1.7 \times 10^{-3}$ (ppm/s). Oxygen production stopped in the $41^{st}$ to $80^{th}$ minutes, corresponding to when the ultrasonic waves were turned off. ZnO fibers in DI water with applied ultrasonic vibrations evolved hydrogen and oxygen gases with a stoichiometric equivalent of $H_2:O_2=2:1$. As with the previous experiments, no oxygen production was observed for the Si wafer control experiment.

Thus, based on the hydrogen and oxygen production tests utilizing the fibers of piezoelectric materials (e.g., ZnO, quartz, $BaTiO_3$) in an aqueous environment, there is a direct conversion of mechanical energy (ultrasonic vibration) into the chemical energy (water splitting) as a result of the mechanical strain placed in the fibers. This is believed as a very important step forward to recycling the waste energy into alternative fuel in the future.

The micro- or nano-scale fibers of these materials create high levels of hydrogen production in the aqueous environment conditions as utilized in the above experiments, because the piezoelectric materials are more chemically stable, and able to generate greater electrical potential on the surface for further chemical reactions. In addition, quartz and certain other piezoelectric materials are much cheaper to obtain than other piezoelectric materials, further reducing the barriers to effective use of the piezoelectrochemical effect to generate useful energy from waste energy.

Similarly, when the external mechanical input is turned off, electrical charges will no longer accumulate on the fiber surface. Thus no sufficient potential can be used to reduce or oxidize the water molecules into hydrogen and oxygen, respectively. This is evidenced by the fact that we did not observe a rapid gas growth rate without vibration compared to the vibration mode. Our conclusions are that quartz, ZnO fibers and $BaTiO_3$ dendrites show very good responses to the application of ultrasonic vibrations by generating $H_2$ and $O_2$ directly from water. Based on the gas production tests above, we have confirmed the piezoelectrochemical (PZEC) effect by using the quartz, ZnO and $BaTiO_3$ fibers in wet conditions.

PZEC Efficiency Calculation

The efficiency of the PZEC effect can be measured as a function of fiber aspect ratio. In this case, samples with different average fiber lengths were prepared by varying the synthetic time and precursor concentration during the hydrothermal process. Each sample was immersed into DI water along with ultrasonic wave vibration during the reaction. The hydrogen production performance was monitored. The efficiency of each sample was then calculated by the ratio of produced chemical potential output over the effective mechanical energy input. The value of the output chemical energy was calculated from the observed hydrogen production rate, in which the standard reduction potential of water, 1.23 eV was used. In addition, in order to eliminate other factors such as surface area or secondary branches, we use ZnO fibers to demonstrate the efficiency calculations below and assume each fiber as a 3D tetragonal prism-shaped fiber with uniform width and height (0.4 μm) on the two ends, and therefore the aspect ratio is only varied by the fiber length. Looking now at Table 8, the initial generation rate of $H_2$ evolution is $8.56 \times 10^4$ $ppms^{-1}$, $1.30 \times 10^{-3}$ $ppms^{-1}$, $2.61 \times 10^{-3}$ $ppms^{-1}$, and $4.25 \times 10^{-3}$ $ppms^{-1}$ for the ZnO fibers having aspect ratio of 14.3, 16.5, 18.3, and 19.5, respectively. The system without any ZnO fibers presented was examined by the same method as a control experiment. The $H_2$ production rate of the control experiment is negligible. It is noticed that the ZnO fiber samples with a greater aspect ratio shows a better production rate. The efficiency of converting the mechanical energy from the ultrasonic waves to chemical potential driving the water splitting by piezoelectrochemical effect can be calculated as the follows. The average output chemical potential by single ZnO fiber is $$E_{chem} = \frac{2n_{H_2} E_t N_A e}{N_{fiber}}$$

where $n_{H_2}$=hydrogen produced in moles; $E_t$=threshold energy of water decomposition=1.23 eV; $N_A$=Avogadro's number; e=electron volt, $N_{fiber}$=number of fibers. The input elastic deformation energy generated by ultrasonic wave can be found from the bending of the fibers by assuming that all the acoustic pressure is transformed into the force for fiber deformation. Accordingly, the acoustic pressure is:

$$P_A = \sqrt{2I\rho c} \text{ and } P_{effective} = \frac{P_A}{\sqrt{2}}$$

where I=acoustic intensity=0.63 $Wcm^{-2}$; $\rho$=density of water; c=speed of light in water. It is worth to note that the reflectivity (R) of the sample glass tube against the ultrasonic wave was considered and R is found to be 0.185 (see detail calculation in the following section). In addition, we assume the ultrasonic waves propagated across the system normal to the cross-section area of the reaction cell. As a result, the input mechanical energy created by ultrasonic wave vibrations acting on the fibers is $$E_{mech} = \frac{175F^2L^3}{4608YI}$$

where F=average force acting on one fiber; L=fiber length; Y=Young's modulus, and I is the inertia of the ZnO fiber. Assuming the energy did not lost in any other form, therefore, the efficiency of converting mechanical energy to chemical energy is:

$$\text{Efficiency} = \frac{E_{chem}}{E_{mech}} * 100\%$$

The math below shows one example of calculation details for the PZEC efficiency by using a typical ZnO fiber with a length of 5.68 μm.
Mechanical Energy:
Acoustic Intensity from the ultrasonic generator, $I_0$:

$$I_0 = \frac{\text{Watt}}{\text{cm}^2} = \frac{185(W)}{24.5*12(\text{cm}^2)} = 0.629$$

185 W=reported value from the manufacture.
24.5×12=cross section area of the ultrasonic tank, in which we assume the ultrasonic wave propagates across the tank.

Reflectivity, R (1) (reflectivity of the glass tube against the ultrasonic vibrations):

$$R = \left(\frac{\rho_{glass}c_{glass} - \rho_{water}c_{water}}{\rho_{glass}c_{glass} + \rho_{water}c_{water}}\right)^2$$

$$= \left(\frac{2.8(\text{g/cm}^3)*2E8(\text{m/s}) - 1.0(\text{g/cm}^3)*2.25E8(\text{m/s})}{2.8(\text{g/cm}^3)*2E8(\text{m/s}) + 1.0(\text{g/cm}^3)*2.25E8(\text{m/s})}\right)^2$$

$$= 0.185$$

ρ=density of media
c=speed of light in media $$I_1 = (1-R)*I_0 = (1-0.185)*0.629 = 0.513$$

$I_1$=transmitted acoustic intensity after the glass tube reflectivity

Therefore, the acoustic pressure:

$$P_{effective} = \frac{\sqrt{2I_1\rho_{water}c_{water}}}{\sqrt{2}}$$

$$= \sqrt{0.513*1.0*2.28E8}$$

$$= 1.07E4(\text{N/m}^2)$$

$$= \frac{F}{A}$$

A=cross section of 5 mL water in the test tube=2.98 cm²
Thus, $$F = P_{effective}*A = 1.07E4(\text{N/m}^2)*2.98E-4(\text{m}^2) = 3.2\text{N}$$

Next, the cross-section area of the fiber (cm²):

$$A_{fiber} = b*L = (0.4E-4)(\text{cm})*(5.68E-4)(\text{cm}) = 2.27E-8 \text{ (cm}^2)$$

Therefore, the fraction of force acting on a fiber can be estimated:

$$F_{fiber} = \frac{F*A_{fiber}}{A}$$

$$= \frac{3.20(N)*(2.27E-8)(\text{cm}^2)}{2.98(\text{cm}^2)}$$

$$= (2.44E-8)(N)$$

The Young's Modulus of ZnO fiber is:

$$Y = \frac{K_nL^3}{192I}$$

$$= \frac{1.86(\text{N/m})*(5.68E-6)^3}{192*(2.13E-27)(\text{m}^4)}$$

$$= 8.33E-8(\text{Pa})$$

L=Fiber length
$K_n$=spring constant=1.86 (N/m) (3, 5)
I=ZnO fiber inertia=2.13E-27 (m⁴) (3)
Finally, the mechanical energy acting on fiber causing the deformation:

$$E_{mech} = \frac{175F_{fiber}^2L^3}{4608YI}$$

$$= \frac{175*(2.44E-8)^2(5.68E-6)^3}{4608*(8.33E10)*(2.13E-27)}$$

$$= (2.34E-15)(\text{J/fiber})$$

Chemical Energy:

$$(8.56E-4)(\text{ppm/s}) = \frac{(8.56E-10)(\text{mol})}{24.5(\text{mol}/L)}*\frac{1}{1000}(L)$$

$$= (3.49E-14)$$

$$= n_{H_2}(\text{moles of hydrogen})$$

$$E_{chem} = \frac{(3.49E-14)*1.23(\text{eV})*(6.02E23)*(1.602E-19)(\text{J/eV})*2}{(5.18E7)(\text{fibers})}$$

$$= (1.6E-16)(\text{J/fiber})$$

Overall Efficiency:

$$\text{Efficiency} = \frac{E_{chem}}{E_{mech}}*100\% = \frac{160E-16(\text{J/fiber})}{2.34E-15(\text{J/fiber})}*100\% = 6.9\%$$

Finally, Table 8 summarizes the PZEC efficiency of BaTiO₃ fibers and ZnO fibers as a function of fiber length.

TABLE 8

Rates of gas evolution and physical properties of the fibers

|  | Average length L (μm) | Aspect Ratio | $H_2$ Rate (ppm/s) (1E−4) | $E_{chem}$/Fiber (1E−16) (J) | Y (GPa) | $E_{mech}$/Fiber (1E−15) (J) | Efficiency (%) |
|---|---|---|---|---|---|---|---|
| ZnO* | 5.7 | 14.2 | 8.6 | 1.6 | 0.8 | 2.3 | 6.9 |
| ZnO | 6.6 | 16.5 | 13.0 | 2.4 | 1.1 | 2.9 | 8.5 |
| ZnO | 7.3 | 18.1 | 26.1 | 4.9 | 1.7 | 3.8 | 12.8 |
| ZnO | 7.8 | 19.5 | 42.5 | 8.0 | 2.2 | 4.4 | 18.0 |
| $BaTiO_3$** | 10 | 25 | 12.5** | 1.6 | 6.7# | 4.9 | 3.2 |

*An estimate fiber number of $5.18 \times 10^7$ is used in calculation based on SEM images.
**An estimate fiber number of $7.7 \times 10^8$ is used in calculation based on SEM images.
Young's modulus in bulk material.

Figure 33:
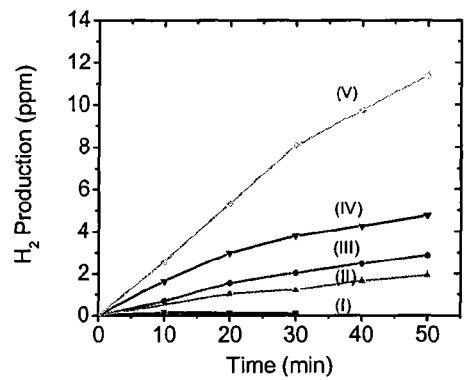
FIG. 33 is a graph of the hydrogen evolution of the ZnO fibers under standard condition with various average fiber lengths: (I) control or no fiber, (II) 5.7 μm, (III) 6.3 μm, (IV) 7.3 μm, and (V) 7.8 μm.
Figure 34:
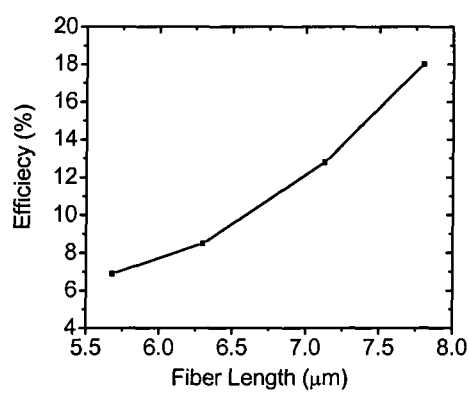
FIG. 34 is a graph illustrating the efficiency of the piezo-electrochemical effect for converting mechanical energy into chemical energy as a function of ZnO fiber length.

FIG. 33 shows the $H_2$ evolution from pure water by as-synthesized ZnO fibers with different average fiber length (L) under ultrasonic wave vibration. The PZEC efficiency due to different average fiber length is shown in FIG. 34. The observed chemical energy output by a single ZnO fiber with L=5.7 μm in one vibration event is ~$1.6 \times 10^{-16}$ J, and the effective mechanical energy input applied on the fiber was ~$2.3 \times 10^{-15}$ J (see Supplementary Information for detailed calculations). The PZEC mechanical to chemical efficiency was found to be ~6.9%. Increasing the ZnO fiber length to L=7.8 μm increased reaction efficiency to ~18%. An increase in the efficiency can be explained by the strain-induced voltage related to the curvature of the fiber. Fibers with greater lengths (L) exhibit a greater bending curvature than that of shorter fiber lengths when under the same applied force in a vibration event. Due to this property, in our ZnO fiber trials with equal mechanical vibration, longer fibers build up a higher number of voltages that exceed the water reduction potential. Therefore, the trials with a longer fiber length demonstrated an increased hydrogen production performance, providing higher efficiency for mechanical to chemical energy conversion. As a result of the above testing, though this will vary depending upon the particular piezoelectric material being utilized, the fibers of the suitable piezoelectric materials that can be utilized in generating the PZEC effect for driving redox reactions are at least 2 μm in length, in order to provide sufficient length for the fibers to be deformed upon application of vibrations to the fibers. A more preferred range of lengths for the fibers is 2 μm to 1000 μm. With longer fiber lengths, the efficiency is increased along with the amount of flexing of the individual fibers, as well as the potential for multiple bends in the fibers, resulting in multiple reaction or nucleation sites on a single fiber.

The PZEC efficiency of $BaTiO_3$ dendrites in water was also demonstrated through our experiments. Here, the $H_2$ production test obtained a production rate of $1.25 \times 10^{-2}$ ppm per second (ppm/s). In addition, based on SEM images, density (6.08 g/cm$^3$) and the volume of a single $BaTiO_3$ dendrite branch, the overall $BaTiO_3$ dendrites mass ($7.5 \times 10^{-3}$ g), the estimated number of the dendrites in the system, and thus the mechanical-to-chemical conversion efficiency of the $BaTiO_3$ dendrites with an average length of 10 μm was found to be 3.2%. $BaTiO_3$ dendrites intrinsically have a slightly greater electromechanical coupling coefficient value (k) (($k_{33}$, $BaTiO_3$=0.49, $k_{33}$, ZnO=0.408)) and, extrinsically, a larger aspect ratio than that of ZnO fibers. This indicates a higher efficiency from the $BaTiO_3$ dendrites expected. However, $BaTiO_3$ dendrites are composed of branch-like structures which may limit the degree of deflections of each individual $BaTiO_3$ branch with applied vibrations. Unlike ZnO fibers, which spread freely through a given space, $BaTiO_3$ dendrites are bundled together in groups. As a result, the dendrites are more likely to be in contact with each other when deformation occurs, leading to partial charge cancellations and a lower gas production rate from the reaction. Morphologically, we anticipate that performance will be greatly increased by selecting chemically stable fiber and dendrite materials with greater k values, larger aspect ratio and surface areas, and ensuring the fiber and dendrites are spaced out for more bending space to avoid charge cancellations.

Using fibrous ZnO and dendritic $BaTiO_3$ catalysts with piezoelectric properties, we have demonstrated the PZEC effect for generating $H_2$ and $O_2$ from water which results in a direct conversion of mechanical energy to chemical energy. Finding an optimum fiber length and introducing the optimal, e.g., resonant, frequency of ZnO and $BaTiO_3$ for the direct water-splitting process, it may be possible to obtain a much greater $H_2$ and $O_2$ production rate.

Utilizing the piezoelectric fibrous samples, the phenomena demonstrated could usher in a new era in the field of recycling environmental waste energy into precious alternative chemical energy. This is because the origin of the mechanical energy for use in driving the PZEC effect could be supplied from a renewable energy source or a common waste energy source in a mechanical form, i.e. vibration, at frequencies ranging from those occurring in nature on the order of fractions of Hz, e.g., greater than 0 Hz, to natural or man-made sound or mechanical vibrations on the order of multiple Hz, e.g., from about 1 Hz to about 20 kHz, to man-made ultrasonic vibrations on the order of greater than 20 kHz. In brief, so long as the vibration is sufficient to mechanically stress or deflect the fibers to generate the electrical potential to drive the redox reaction, virtually any source of vibration can be utilized. Vibrational waste energy generated in the environment from noise, wind power, or water wave action can be scavenged or harvested as a driving force for direct water-splitting, thereby forming $H_2$ and $O_2$ by means of PZEC fiber arrays implanted on a suitable substrate, such as a flexible film of ZnO and Barium titanates. The piezoelectric material fibers can be positioned on the material in arrays that provide the necessary spacing between fibers to prevent any cancellation of the vibration of adjacent fibers by direct interaction of the fibers with one another. In a preferred embodiment for this application of the fibers for producing the PZEC effect to drive a redox reaction, e.g., water-splitting, the spacing is approximately from 50 nm to 20 microns. The orientation of the fibers on the substrate is less important, as the deformation of the fibers occurs as a result of the vibrations striking the fibers regardless of whether the fibers are secured to the substrate at one end, at both ends, are disposed in a co-planar configuration with regard to the substrate, or are utilized without a substrate entirety, i.e., the fibers are free floating within the reaction environment.

Application of PZEC in Other Organic Redox Reactions

Due to the ability of the piezoelectric materials to produce the necessary potential to initiate a water-splitting reaction, the same potential can be utilized as a driver for other redox reactions as well. Table 7 below lists some of the possible redox indictors that can be used to study the piezoelectrochemistry in redox reactions that could potentially be driven by the PZEC effect provided by suitable piezoelectric materials, including, but not limited to, quartz, ZnO, and $BaTiO_3$. Reaction kinetics can be determined by evaluating the changes of organic concentrations of the components o the reaction as a function of time.

TABLE 7

Possible oxidation-reduction indicators for piezoelectrochemistry

| Indicator | $E^0$, V | Color of Ox. form | Color of Red. Form |
|---|---|---|---|
| 2,2'-Bipyridine (Ru complex) | 1.33 | colorless | Yellow |
| Nitrophenanthroline (Fe complex) | 1.25 | cyan | Red |
| n-Phenylanthranilic acid | 1.08 | violet-red | Colorless |
| 1,10-Phenanthroline (Fe complex) | 1.06 | cyan | Red |
| n-Ethoxychrysoidine | 1 | red | Yellow |
| 2,2'-Bipyridine (Fe complex) | 0.97 | cyan | Red |
| 5,6-Dimethylphenanthroline (Fe complex) | 0.97 | yellow-green | Red |
| o-Dianisidine | 0.85 | red | Colorless |
| Sodium diphenylamine sulfonate | 0.84 | red-violet | Colorless |
| Diphenylbenzidine | 0.76 | violet | Colorless |
| Diphenylamine | 0.76 | violet | Colorless |

For example, the piezoelectric property of piezoelectric materials can potentially be utilized as a catalyst or the oxidation of organic pollutants, such as volatile organic compounds (VOC). In this situation, the positive charges on the piezoelectric materials surface can trigger the oxidation reactions for the VOC and covert the toxic chemicals into less harmful or non-toxic forms, i.e. $CO_2$. The advantage is that, similarly to the reduction of water, the piezoelectric material itself is environmentally friendly, and can be used for VOC decomposition and waste cleanup at a very low cost.

This discovery and research can potentially have highly significant impact on energy and environmental applications based on the following:

1) a piezoelectric material suspension in water without any external energy yielded a significantly greater amount of hydrogen than commercial and current existing products or processes; because of the simplicity and robustness of the process, this novel mechanism may be ideal driving redox reactions, such as for large scale of hydrogen production and decontamination of volatile compounds in gas and liquid phase, among other suitable redox reactions;
2) the abundance of certain piezoelectric materials that can be used in the method greatly lowers the cost of utilization of this application; and
3) unlike many other methods that use or involve toxic chemicals, such as metal-organics, all of the materials in our system are environmentally friendly, in which a truly "clean energy" production can be achieved.

Various alternatives are contemplated as being within the scope of the following claims particularly pointing out and distinctly claiming the subject matter regarded as the invention.

We hereby claim:

1. A method for initiating a reduction/oxidation reaction, the method comprising the steps of:
   a) placing a piezoelectric material in an environment containing the reactants for the reduction/oxidation reaction;
   b) mechanically stressing the piezoelectric material to generate an electrical potential at the exterior surface of the piezoelectric material to initiate the redox reaction by directing vibrations at the piezoelectric material; and
   c) optimizing the length of the piezoelectric material based on a calculated efficiency of the piezoelectric material, wherein the calculated efficiency is calculated as a ratio of produced chemical output over effective mechanical energy input.

2. A method for initiating a reduction/oxidation reaction, the method comprising the steps of:
   a) placing a piezoelectric material in an environment containing the reactants for the reduction/oxidation reaction;
   b) mechanically stressing the piezoelectric material to generate an electrical potential at the exterior surface of the piezoelectric material to initiate the redox reaction; and
   c) optimizing the length of the piezoelectric material based on a calculated efficiency of the piezoelectric material, wherein the calculated efficiency is calculated as a ratio of produced chemical output over effective mechanical energy input.

3. The method of claim 2 wherein the step of mechanically stressing the piezoelectric material comprises applying a mechanical force to the piezoelectric material.

4. The method of claim 3 wherein the step of mechanically stressing the piezoelectric material comprises directing vibrations at the piezoelectric material.

5. The method of claim 4 wherein the step of directing vibrations at the piezoelectric material comprises placing the environment in which the piezoelectric material is contained in contact with a vibration source to enable the vibrations from the vibration source to be transmitted through the environment into contact with the piezoelectric material.

6. The method of claim 4 wherein the step of directing vibrations at the piezoelectric material comprises directing vibrations from a man-made vibration source at the piezoelectric material.

7. The method of claim 4 wherein the step of directing vibrations at the piezoelectric material comprises directing vibrations from a natural vibration source at the piezoelectric material.

8. The method of claim 2 wherein the step of placing the piezoelectric material in the environment comprises placing the piezoelectric material in an aqueous environment.

9. The method of claim 8 further comprising the step of initiating a water-splitting reaction in the aqueous environment after mechanically stressing the piezoelectric material.

10. The method of claim 2 wherein the step of providing the piezoelectric material comprises providing a piezoelectric material selected from the group consisting of quartz, $BaTiO_3$ and ZnO.

11. The method of claim 2 wherein the step of providing the piezoelectric material comprises providing a piezoelectric material that has a calculated efficiency of at least 3.2%.

12. The method of claim 2 further comprising the step of securing one end of the piezoelectric material fiber to a substrate prior to placing the piezoelectric material fiber in the environment.

13. The method of claim 12 wherein the step of securing the one end of the piezoelectric material fiber to the substrate comprises adhering the piezoelectric material fiber to the substrate.

14. The method of claim 12 wherein the step of securing the one end of the piezoelectric material fiber to the substrate comprises securing the one end of the piezoelectric material fiber to the substrate in an array with a spacing between individual fibers of the piezoelectric material sufficient to minimize any cancellation of the vibration of adjacent fibers by direct interaction of the fibers with one another.

15. The method of claim 12 wherein the step of securing the one end of the piezoelectric material fiber to the substrate comprises securing the piezoelectric material fiber in a manner that enables the piezoelectric material fiber to project outwardly from the substrate.

16. The method of claim 2 further comprising the step of capturing any products of the redox reaction for use as a chemical energy source.

\* \* \* \* \*